United States Patent [19]
Miyaza

[11] Patent Number: 5,696,843
[45] Date of Patent: Dec. 9, 1997

[54] AUTOMATIC IMAGE QUALITY CONTROLLING APPARATUS FOR USE IN AN ELECTRONIC COPIER

[75] Inventor: Masao Miyaza, Tenri, Japan

[73] Assignee: Sharp Kabushiki Kaisha, Osaka, Japan

[21] Appl. No.: 440,200

[22] Filed: May 12, 1995

[30] Foreign Application Priority Data

Jun. 22, 1994 [JP] Japan ................... HEI6-140090

[51] Int. Cl.⁶ ................................................. G06K 9/34
[52] U.S. Cl. ...................... 382/176; 358/462; 382/180
[58] Field of Search ........................... 382/176, 180, 382/286, 298, 175, 254; 358/462, 453

[56] References Cited

U.S. PATENT DOCUMENTS

| | | | |
|---|---|---|---|
| 4,503,556 | 3/1985 | Scherl et al. | 382/176 |
| 4,589,144 | 5/1986 | Namba | 382/175 |
| 5,033,097 | 7/1991 | Nakamura | 382/174 |
| 5,091,964 | 2/1992 | Shimomura | 382/176 |
| 5,335,290 | 8/1994 | Cullen et al. | 382/176 |
| 5,381,488 | 1/1995 | Suda et al. | 382/174 |
| 5,481,372 | 1/1996 | Kouno et al. | 382/176 |
| 5,555,556 | 9/1996 | Ozaki | 382/176 |

FOREIGN PATENT DOCUMENTS

| | | |
|---|---|---|
| 0 362 595 A3 | 4/1990 | European Pat. Off. |
| 0 533 177 A3 | 3/1993 | European Pat. Off. |
| 2-59979 A | 2/1990 | Japan |
| 2-253383 | 10/1990 | Japan |

OTHER PUBLICATIONS

Patent Abstracts of Japan, vol. 13, No. 40 (P-820), 30 Jan. 1989, abstracting JP 63-237 182, Ishigami/Ricoh Co. Ltd., of 3 Oct. 1988.

Patent Abstracts of Japan, abstracting JP 7-105 312, Sasaki/Fujitsu Ltd., of 21 Apr. 1995.

*Primary Examiner*—Joseph Mancuso
*Attorney, Agent, or Firm*—David G. Conlin; Milton Oliver

[57] ABSTRACT

An automatic image quality controlling apparatus in an electronic copier classifies image data obtained through an image pickup means is divided into character part and picture part, detects an overall height of characters based on a distance between character lines in character part and detects an overall width of characters based on a distance between character columns in character part. Based on the information thus obtained, the apparatus decides an overall size of outline squares for characters, assumes positions of segments where characters should be located, comparatively judges whether any isolated image data resides in the assumed segments, separates irregular components based on the result determined and erases the irregular components separated.

6 Claims, 24 Drawing Sheets

ORIGINAL

EFFECTIVE COMPONENTS

EFFECT REDUCTION

IRREGULAR COMPONENTS

REDUCING MODE

IRREGULAR COMPONENT

>

8 X 8 PIXELS

REDUCTION

≦

ERASE IRREGULARITY

ORIGINAL

CHARACTER DETECTION

DETECTION OF A SIZE OF OUTLINE SQUARES
DETECTION OF INTERVALS BETWEEN CHARACTERS

ASSUMPTION OF CHARACTER POSITIONS

ASSUMPTION

→ OUTLINE SQUARE SIZE FOR A CHARACTER

IRREGULARITY JUDGMENT

OUTLINE SQUARE SIZE

DETERMINE AS A CHARACTER

DETERMINE AS IRREGULARITY

FIG.21
ORIGINAL
A B C D E 
EFFECTIVE COMPONENTS
A B C E D
IRREGULAR COMPONENTS
EFFECT REDUCTION
REDUCING MODE
IRREGULAR COMPONENT
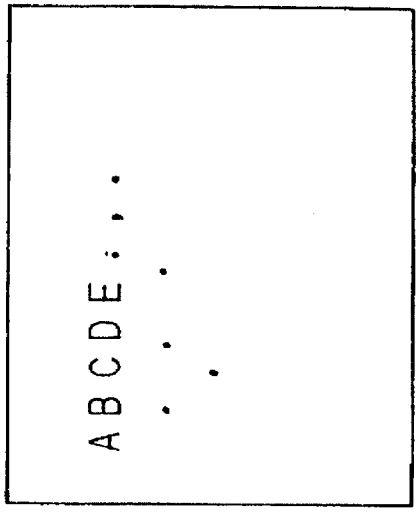
>  THRESHOLD VALUE 8 × 8 PIXELS  REDUCTION
≦    ERASE IRREGULARITY

FIG. 25
ORIGINAL
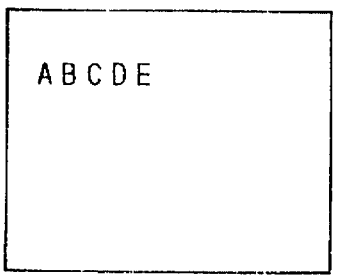
DETECT CHARACTERS
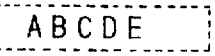
DETECT AN OUTLINE SQUARE SIZE
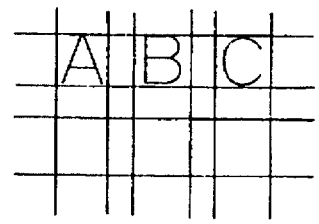
ONE-EIGHTH OF OUTLINE SQUARE SIDE
CHANGE THE THRESHOLD IN ACCORDANCE WITH OUTLINE SQUARE SIZES
| IRREGULAR COMPONENT | | THRESHOLD VALUE | |
|---|---|---|---|
|  | $>$ |  | DETERMINE AS A CHARACTER |
|  | $\leq$ |  | DETERMINE AS IRREGULARITY |

AUTOMATIC IMAGE QUALITY CONTROLLING APPARATUS FOR USE IN AN ELECTRONIC COPIER

BACKGROUND OF THE INVENTION (1) Field of the Invention

The present invention relates to an automatic image quality controlling apparatus for use in an electronic copier such as a digital copier, facsimile machine, scanner/printer and the like.

(2) Description of the Prior Art

In recent years, electrophotographic copiers have been widely used and digital copiers also have been brought into practice, allowing various kinds of manuscripts to be easily duplicated.

When copying operations are effected using one of such copiers, copies of a facsimile output or other printout are frequently used as an original document. Such a duplicated document, however, tends to have been degraded in quality of image with black spots due to noises of transmission, or dust, smudges on the original document, and if it is used as an original, this creates irregularity on image data of the copied document, making it difficult to read the resulting document. Further, when image processing for image emphasis is made, even the irregularity or smudges may be emphasized.

As a means for separating and deleting irregular areas on an original document, Japanese Patent Application Laid-Open Hei 2 No. 59,979 discloses 'a document image processor' in which character areas and picture areas can be exactly separated from each other by dividing character areas and picture areas by analyzing features of extracted parts from an input document and further judging whether the extracted part belongs to character areas.

When copying operations are carried out in a conventional copier, transmission noises, dust, smudges on the original document etc., may be produced or reproduced as image data on the duplicated document, depending upon the condition of image quality of an original used or the duplicating process. Therefore this makes it troublesome for users to read the resulting document. Further, when image processing for image emphasis is made, even irregularity is emphasized.

SUMMARY OF THE INVENTION

The present invention has been achieved to provide an automatic image quality controlling apparatus for use in electronic copiers in order to solve the above problems, and the gist of the present invention can be described as follows:

First of all, according to a first feature of the present invention, an automatic image quality controlling apparatus for use in an electronic copier comprising: an image pickup means for optically reading and converting an original image into image signals; and an image output means for creating an image from the acquired image signals by the image pickup means and outputting the image on a sheet of paper through a transfer section, includes:

an image area separating means for classifying the image data obtained through the image pickup means into character part and picture part;

a first detecting means for detecting an overall height of characters based on a distance between character lines in character part;

a second detecting means for detecting an overall width of characters based on a distance between character columns in character part;

a size detecting means for detecting an overall size of outline squares for characters from the information obtained from the first and second detecting means;

a character area assuming means for assuming positions of segments where characters should be located;

a comparatively judging means for comparatively judging whether any isolated image data resides in the assumed segments;

an irregular component separating means for separating irregular components based on the result determined from the comparatively judging means; and an erasing means for erasing the irregular components separated by the irregular component separating means.

According to a second feature of the present invention, the size detecting means detects an overall size of characters by determining a distance between lines and a distance between columns based on information acquired from a certain character area consisting of a half or less of the total character lines or of a half or less of the total character columns. According to a third feature of the present invention, in the apparatus according to claim 1, the size detecting means detects an overall size of characters by determining a distance between lines and a distance between columns based on information acquired from a first character line and a first character column in the text.

According to a fourth feature of the present invention, an automatic image quality controlling apparatus in an electronic copier comprising: an image pickup means for optically reading and converting an original image into image signals; and an image output means for creating an image from the acquired image signals by the image pickup means and outputting the image on a sheet of paper through a transfer section, includes:

an image area separating means for classifying the image data obtained through the image pickup means into character part and picture part;

a first detecting means for detecting an overall height of characters based on a distance between character lines in character part;

a second detecting means for detecting an overall width of characters based on a distance between character columns in character part;

a size detecting means for detecting an overall size of outline squares for characters from the information obtained from the first and second detecting means;

a character area assuming means for assuming positions of segments where characters should be located;

an assumed area judging means for comparatively judging whether any isolated image data resides in the assumed segments;

a pattern storing means for storing patterns of preset symbols and characters;

a determining means for detecting irregular components by comparing the isolated image data with the stored patterns based on the result determined from the assumed area judging means;

an irregular component separating means for separating irregular components based on the result determined from the determining means; and an erasing means for erasing the irregular components separated by the irregular component separating means.

According to a fifth feature of the present invention, an automatic image quality controlling apparatus in an electronic copier comprising: an image pickup means for optically reading and converting an original image into image signals; and an image output means for creating an image from the acquired image signals by the image pickup means and outputting the image on a sheet of paper through a transfer section, includes:

an image area separating means for classifying the image data obtained through the image pickup means into character part and picture part;

a first detecting means for detecting an overall height of characters based on a distance between character lines in character part;

a second detecting means for detecting an overall width of characters based on a distance between character columns in character part;

a size detecting means for detecting an overall size of outline squares for characters from the information obtained from the first and second detecting means;

a character area assuming means for assuming positions of segments where characters should be located;

an assumed area judging means for comparatively judging whether any isolated image data resides in assumed segments to detect assumed segments to which isolated image data belongs;

a segment dividing means for dividing the detected, assumed segment into sub-sections based on the result determined by the assumed area judging means;

a locating means for determining which sub-section the isolated image data belongs to in order to detect irregular component;

an irregular component separating means for separating irregular components based on the result determined from the locating means; and an erasing means for erasing the irregular components separated by the irregular component separating means.

According to a sixth feature of the present invention, an automatic image quality controlling apparatus in an electronic copier comprising: an image pickup means for optically reading and converting an original image into image signals; and an image output means for creating an image from the acquired image signals by the image pickup means and outputting the image on a sheet of paper through a transfer section, includes:

a detecting means for detecting effective components and suspected irregular components from the image data obtained by the image pickup means;

an irregular component separating means for separating and effective components and suspected irregular components detected by the detecting means; and an emphasizing mode setting means for effecting image processing for emphasizing images, and is constructed such that, if the emphasizing mode is set up, the suspected irregular components separated by the irregular component separating means are not subjected to the image processing for emphasizing images.

According to a seventh feature of the present invention, an automatic image quality controlling apparatus in an electronic copier comprising: an image pickup means for optically reading and converting an original image into image signals; and an image output means for creating an image from the acquired image signals by the image pickup means and outputting the image on a sheet of paper through a transfer section, includes:

a detecting means for detecting effective components and suspected irregular components from the image data obtained by the image pickup means;

an irregular component separating means for separating and effective components and suspected irregular components detected by the detecting means; and an enlarging mode setting means for enlarging images, and is constructed such that, if the enlarging mode is set up, the suspected irregular components separated by the irregular component separating means are not subjected to the image processing for enlarging images.

According to an eighth feature of the present invention, an automatic image quality controlling apparatus in an electronic copier comprising: an image pickup means for optically reading and converting an original image into image signals; and an image output means for creating an image from the acquired image signals by the image pickup means and outputting the image on a sheet of paper through a transfer section, includes:

a detecting means for detecting effective components and suspected irregular components from the image data obtained by the image pickup means;

an irregular component separating means for separating and effective components and suspected irregular components detected by the detecting means;

a magnification-varying mode setting means for enlarging or reducing images; and a judging means for judging which mode the apparatus operates in an enlarging mode or a reducing mode when the magnification-varying mode is set up, and is constructed such that, based on the result determined by the judging means, in a case of the enlarging mode, suspected irregular components separated by the irregular component separating means are not subjected to the image processing for enlarging images while, in a case of the reducing mode, suspected irregular components separated by the irregular component separating means are subjected to the image processing for reducing images.

According to a ninth feature of the present invention, an automatic image quality controlling apparatus in an electronic copier comprising: an image pickup means for optically reading and converting an original image into image signals; and an image output means for creating an image from the acquired image signals by the image pickup means and outputting the image on a sheet of paper through a transfer section, includes:

a detecting means for detecting effective components and suspected irregular components from the image data obtained by the image pickup means;

an irregular component separating means for separating and effective components and suspected irregular components detected by the detecting means; and a reducing mode setting means for reducing images, and is constructed such that, when the reducing mode is set up and if the reduced sizes of suspected irregular components separated by the irregular component separating means are smaller than a predetermined threshold value, the suspected irregular components are erased.

According to a tenth feature of the present invention, an automatic image quality controlling apparatus in an electronic copier comprising: an image pickup means for optically reading and converting an original image into image signals; and an image output means for creating an image from the acquired image signals by the image pickup means and outputting the image on a sheet of paper through a transfer section, includes:

an image area separating means for classifying the image data obtained through the image pickup means into character part and picture part;

a first threshold setting means for indicating the maximum size of irregularity in character part;

a second threshold setting means for indicating the maximum size of irregularity in picture part;

a comparatively judging means for comparing the size of isolated image data in each of the character and picture parts with the corresponding threshold value for the part to which the isolated image data in question belongs;

an irregular component separating means for separating irregular components based on the result determined from the comparatively judging means; and an erasing means for erasing the irregular components separated by the irregular component separating means.

According to an eleventh feature of the present invention, an automatic image quality controlling apparatus in an electronic copier according to the tenth feature, further includes:

an image area separating means for classifying the image data of an original obtained in the electronic copier into character part and picture part;

a first detecting means for detecting an overall height of characters based on a distance between character lines in character part;

a second detecting means for detecting an overall width of characters based on a distance between character columns in character part;

a size detecting means for detecting an overall size of outline squares for characters from the information obtained from the first and second detecting means;

a threshold setting means for setting different maximum sizes of irregularity for different detecting sizes; and a comparatively judging means for comparing the size of image data with a threshold value determined in accordance with the size of outline squares for characters.

As the automatic image quality controlling apparatus in an electronic copier according to the present invention, has a configuration described above, it is possible to detect effective components and irregular components in an original and separate one from the other to thereby erase the irregular components.

BRIEF DESCRIPTION OF THE DRAWINGS

FIG. 21 is an illustrative view showing a schematic example of the copying procedure shown in FIG. 20;

FIG. 25 is an illustrative view showing a schematic example of the copying procedure shown in FIG. 24.

DESCRIPTION OF THE PREFERRED EMBODIMENTS

An automatic image quality controlling apparatus of the present invention will hereinafter be described with reference to the accompanying drawings.

Figure 1:
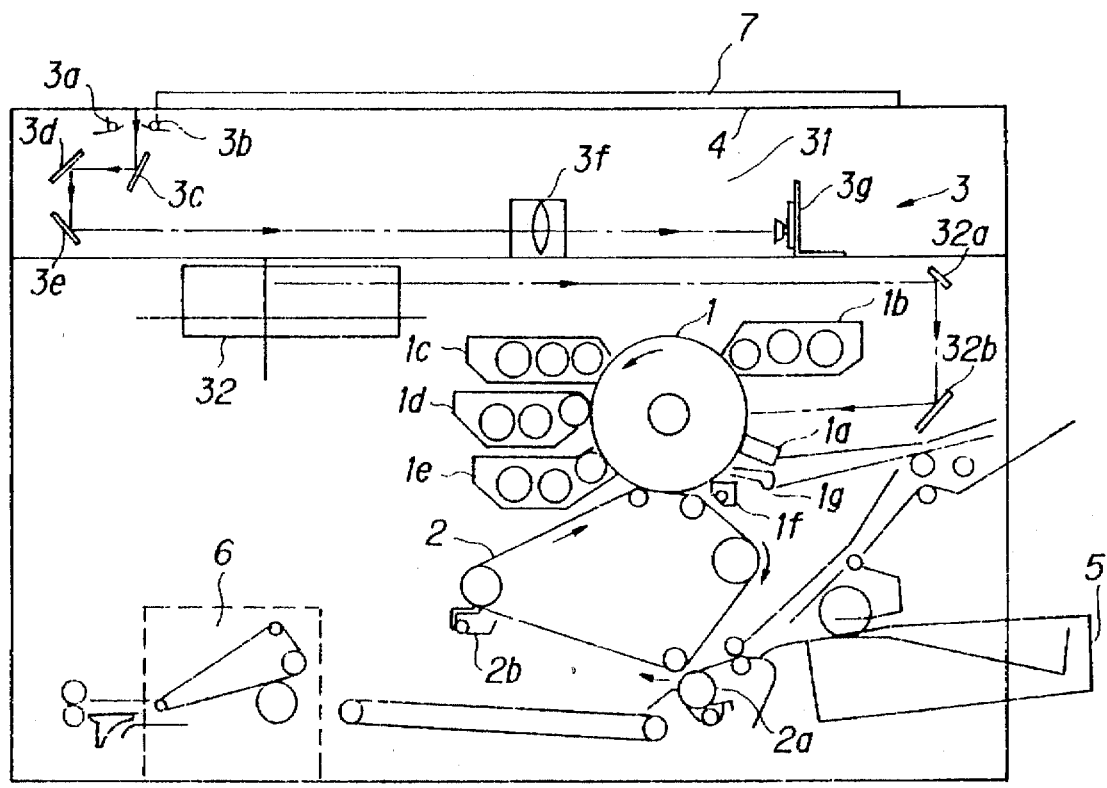
FIG. 1 is a schematic view showing an overall structure of a copier for realizing the present invention.
Figure 2:
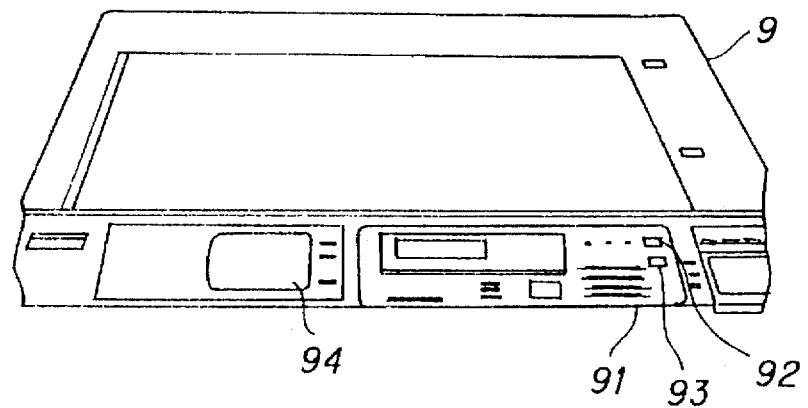
FIG. 2 is a perspective view showing a control panel in a copier for realizing the present invention.

FIG. 1 is a front view showing an overall configuration of a color copier and FIG. 2 is an overall view showing a control panel of the copier.

The copier body includes a drum-shaped photoreceptor 1 in a center thereof. Provided around the photoreceptor 1 are a charger 1a, a black developer hopper 1b, a yellow developer hopper 1c, a magenta developer hopper 1d, a cyan developer hopper 1e, a cleaner 1f and an erasing lamp 1g, all arranged in this order. An intermediate transfer support 2 is disposed between the cyan developer hopper 1e and the cleaner 1f. A transfer device 2a as well as a cleaner 2b is disposed around the intermediate transfer support 2. Provided in the upper part of the copier body is an optical system 3, which comprises an original pickup unit 31 and a laser driver unit 32. The original pickup unit 31 includes light sources 3a and 3b, mirrors 3c to 3e, a lens 3f and a CCD sensor 3g.

The original pickup unit 31 acquires an image on an original placed on an original table 4 by illuminating the original and picking up the reflected light as image data. The thus picked up image data is image-processed and sent to the laser driver unit 32, which in turn outputs the data as laser beams. The laser beams are guided through mirrors 32a and 32b toward the photoreceptor 1. As the laser beams illuminate the photoreceptor 1 whose surface is charged before the laser beams are irradiated thereon, a static latent image is created on the surface of the photoreceptor. The thus formed static latent image is supplied with one of developers from the developer hoppers 1b through 1e, whereby a toner image (visualized image) is formed. The toner image is transferred to the intermediate transfer support 2. Equipped on the right side face of the copier body is a sheet cassette 5 holding a stack of sheets, onto which the copy image (toner image) is to be transferred. A fixing unit 6 is provided on the left bottom portion inside the copier body. Sheets held in the sheet cassette 5 are fed one by one to a position where the transfer device 2a is located and the toner images are transferred to the sheet. The sheet with the toner image thereon is introduced to the fixing unit 6 where the toner is fixed on the sheet.

When a color copying operation is performed in the thus configurated copier, a color original placed on the original table 4 is scanned to pick up image data of red (R), green (G) and blue (B) colors so as to form data on yellow component, which in turn is outputted as laser beams. The laser beams create a static latent image on the photoreceptor 1 so that the latent image is supplied with yellow toner. The thus formed yellow-toner image is transferred to the intermediate transfer support 2. Subsequently, the color original on the original table 4 is rescanned to pick up the image data of R, G and B so as to form data on magenta component, which in turn is outputted as laser beams. The laser beams create a static latent image on the photoreceptor 1 so that the latent image is supplied with magenta toner. The magenta-toner image is then transferred to the intermediate transfer support 2 so as to be laid over the yellow-toner image previously transferred thereon. A further scanning of the same original is effected to pick up the image data of R, G and B so as to form data on cyan component, which in turn is outputted as laser beams. The laser beams create a static latent image on the photoreceptor so that the latent image is supplied with cyan toner. The cyan-toner image is transferred to the intermediate transfer support 2 so as to be laid over previously transferred images of yellow toner and magenta toner. Thus, the intermediate transfer support 2 bears three colors of toner images, of yellow, magenta and cyan superposed or registered each other. The toner images of the three colors are transferred onto the sheet at the same time and then fixed on the sheet as a color image in the fixing unit 6.

An original cover 7 is provided on the top of the original table 4.

Figure 3:
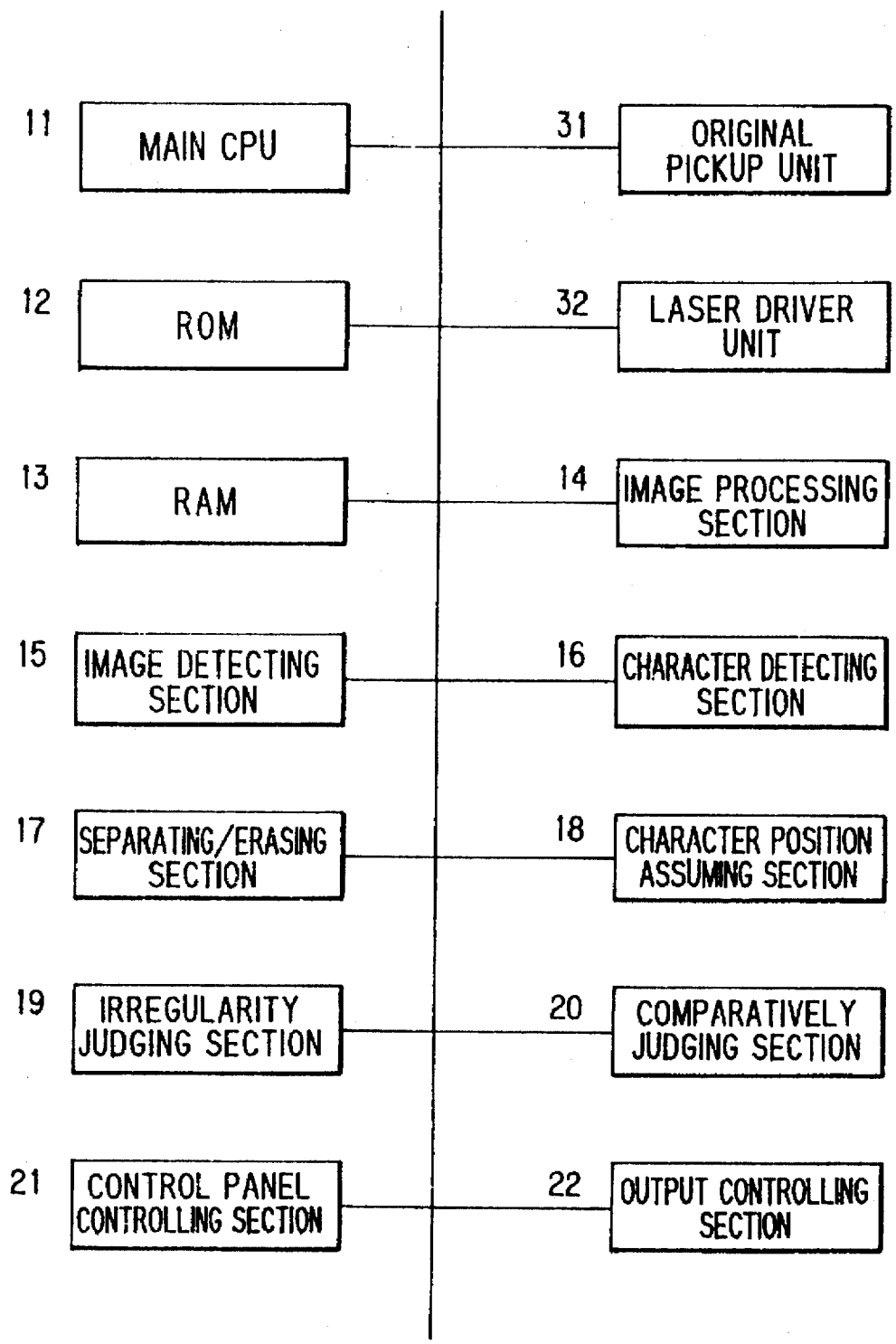
FIG. 3 is block diagram showing essential block circuits in a copier for realizing the present invention.

FIG. 3 is a block diagram showing essential blocks of the copier described above.

A main CPU 11 controls a plurality of controlling portions in the original pickup unit 31, the laser driver unit 32 etc. A ROM 12 is used as areas for storing control programs while a RAM 13 is used as areas for storing parameters proper to the copier, working areas at the time of running the program and other purposes. The original pickup unit 31 reads image data on the original placed on the original table 4 as stated above. The data thus picked up is controlled by an image processing portion 14. That is, the image processing portion 14 is an area for processing the acquired image data and effects modifications of image density, image magnification and other processing in accordance with user's request. The data thus processed in the image processing portion 14 is sent out to the laser driver unit 32, which in turn outputs it as laser beams. A control panel controlling portion 21 is to control a control panel 9 equipped on the top face of the copier machine body. This control panel 9 has ten-keys 91, an irregularity erasing mode setting key 92, a print start switch 93, an LC panel 94 etc., in order to allow the user to input copy data as well as to make sure the displayed data etc.

(Embodiment 1)

Figure 4:
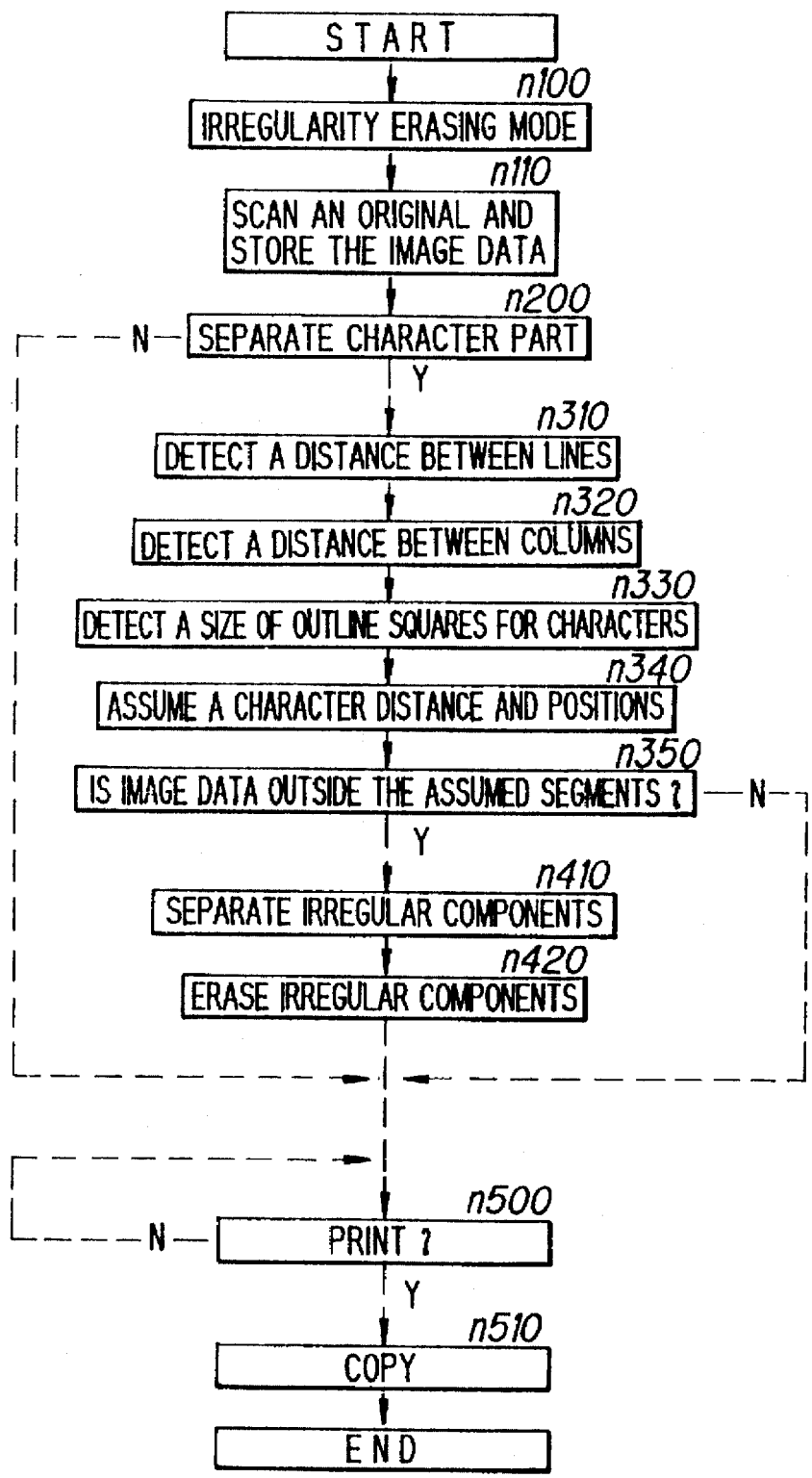
FIG. 4 is a flowchart showing a processing procedure of copying in a first embodiment (embodiment 1) of the present invention.

Referring to FIGS. 4 and 5, an embodiment of the first feature of the present invention will be described. FIG. 4 is a flowchart showing a processing procedure of copying and FIG. 5 is an illustrative view showing a schematic example of the copying procedure shown in FIG. 4. In this embodiment, the copying operation is performed by assuming positions of character segments based on the size and interval of outline squares for characters on an original image data, detecting irregular components in imaged data based on whether the image data belongs to the outside of the assumed character segments, and separating and removing the determined irregular components.

When a correcting mode key 92 on the control panel 9 is pressed, the irregularity erasing mode is activated (n100).

Figure 5A:
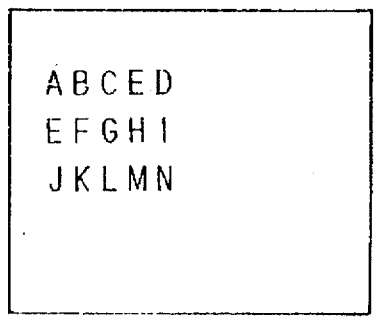
FIG. 5 is an illustrative view showing a schematic example of the copying procedure shown in FIG. 4.

Next, the apparatus scans an original shown in FIG. 5(a) so as to store image data into the memory (n110).

Figure 5B:
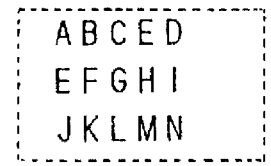

The apparatus detects whether the original contains characters in a manner shown in FIG. 5(b) and selects a next step based on the result (n200).

The detection of whether the original contains characters can be done by sampling characteristics of characters or character recognition. The former method is effected by separating image data into connected pattern units on the basis of features of characters, that is, characters are small, isolated from one another and arranged at intervals of a constant distance and other possible characteristics, and determining whether the patterns coincide with the size of characters.

If the original does not contain any character, a normal copying operation is carried out (n500 to n510).

Figure 5C:
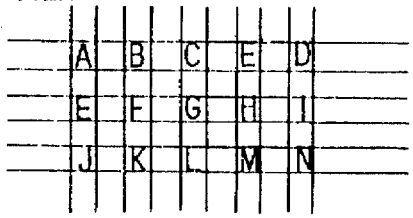
Figure 5D:
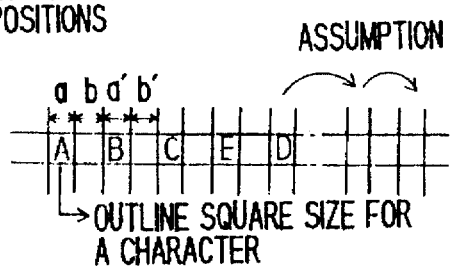
Figure 5E:
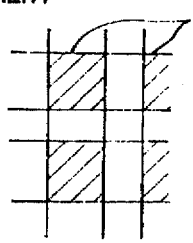

If the original contains characters, the operation is effected in the steps of:

separating character part;

detecting the distance in the entire character part between lines of characters and detecting the distance in the entire character part between columns of characters so as to determine an overall size of outline squares for the characters (n310→n320→n330) as shown in FIG. 5(c);

assuming positions of characters as shown in FIG. 5(d) based on the size of outline squares for the characters to define character segments (n340);

judging whether any part of the image data in the character part lies outside the character segments and selecting a next step based on the judgment (n350); and effecting a normal copying operation (n500→n510) if the image data inside the character part is all contained in the defined character segments, if any parts of the image data inside the character part lie outside the character segments, determining the part as irregular components and effecting a copying operation after separating and erasing the irregular components as shown in FIG. 5(e) (n410→n420→n500→n510).

An advantage of the embodiment 1 is that the determination of whether image data exists in areas assumed based on the detection of the size of outline squares for characters allows a simple configuration without any complicated devices such as character recognizing means and the like to detect irregular components in an original and separate and erase the irregular components whereby a clean duplicate free from smudges can be obtained.

(Embodiment 2)

Figure 6:
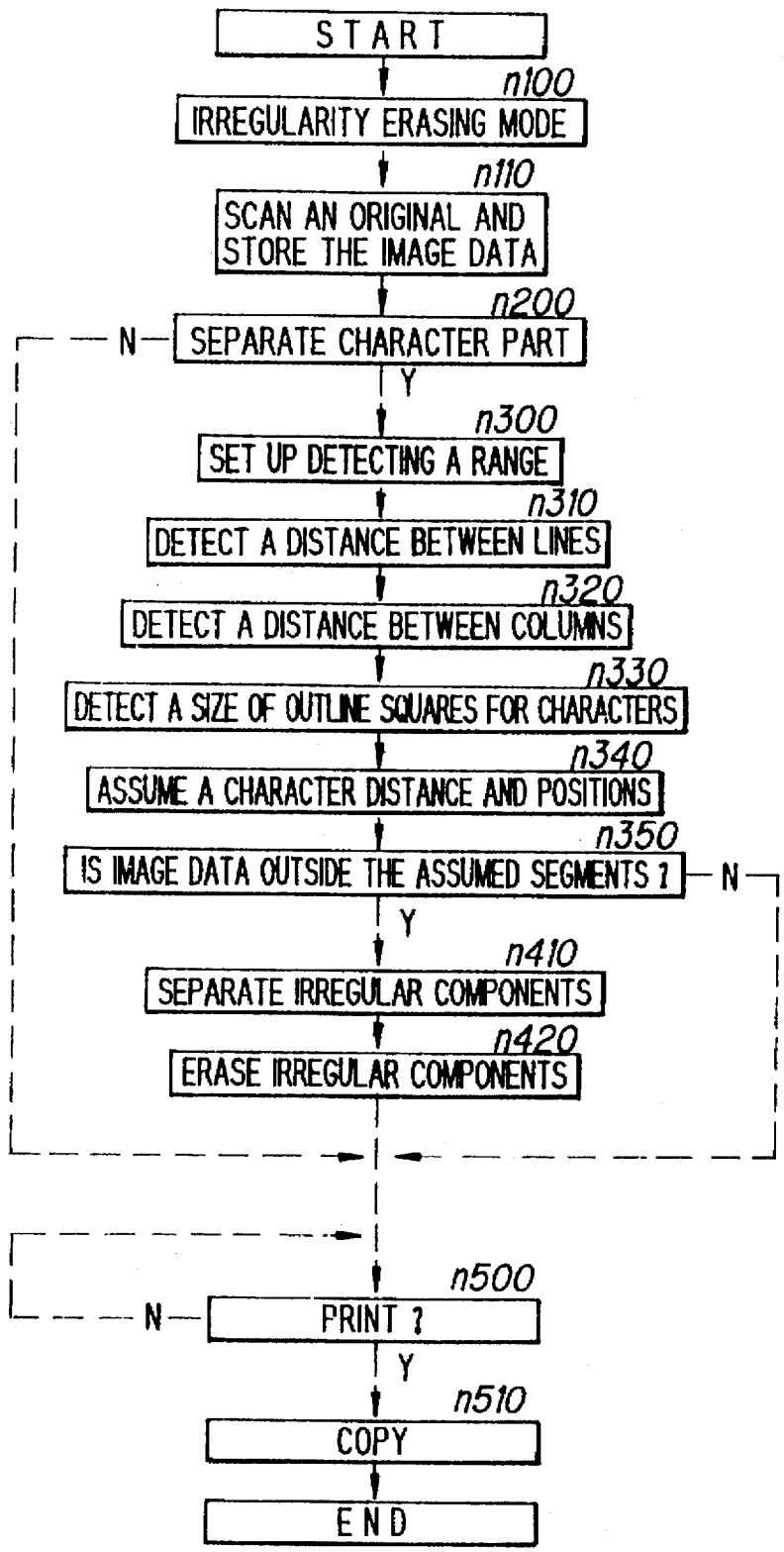
FIG. 6 is a flowchart showing a processing procedure of copying in a second embodiment (embodiment 2) of the present invention.
Figure 7:
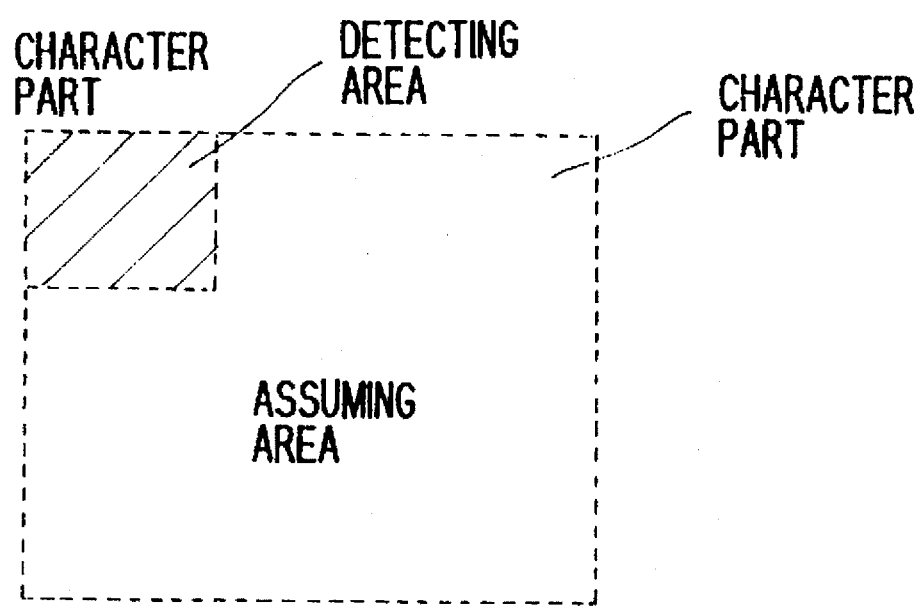
FIG. 7 is an illustrative view showing a schematic example of the copying procedure shown in FIG. 6.

Referring to FIGS. 6 and 7, an embodiment of the second feature of the present invention will be described. FIG. 6 is a flowchart showing a processing procedure of copying and FIG. 7 is an illustrative view showing a schematic example of the copying procedure shown in FIG. 6. In this embodiment, the copying operation is effected by assuming positions of character segments of the whole character strings based on the size and interval of outline squares for characters in a certain region on an original image data, detecting irregular components in image data based on whether the image data belongs to the outside of the assumed character segments, and separating and removing the determined irregular components.

When a correcting mode key 92 on the control panel 9 is pressed, the irregularity erasing mode is activated (n100).

Next, in the same manner as above, the apparatus scans an original so as to store image data into the memory (n110).

The apparatus detects whether the original contains characters and selects a next step based on the result (n200).

The detection of whether the original contains characters can be done by sampling characteristics of characters or character recognition. The former method is effected by separating image data into connected pattern units on the basis of features of characters, that is, characters are small, isolated from one another and arranged at intervals of a constant distance and other possible characteristics, and determining whether the patterns coincide with the size of characters.

If the original does not contain any character, a normal copying operation is carried out (n500 to n510).

If the original contains characters, the operation is effected in the steps of:

separating character part;

selecting a certain range of characters to be detected (n300) (the range may be determined, for example, by selecting several lines with few blank portions from the top line);

detecting the distance in the entire character part between the lines of characters and detecting the distance in the entire character part between columns of characters in the set up range so as to determine an overall size of outline squares for the characters (n310→n320→n330);

assuming positions of characters as shown in FIG. 7 based on the size of outline squares for the characters to define character segments (n340);

judging whether any part of the image data in character part lies outside the character segments and selecting a next step based on the judgment (n350); and effecting a normal copying operation (n500→n510) if the image data inside the character part is all contained in the defined character segments, if any parts of the image data inside the character part lie outside the character segments, determining the part as irregular components and effecting a copying operation after separating and erasing the irregular components (n410→n420→n500→n510).

An advantage of the embodiment 2 is that the assumption of character portions in a certain range can reduce the required memory and improve the speed of processing, effectively for a document with a plenty of blanks and the determination of whether image data exists in expected areas based on the detection of the size of outline squares for characters allows a simple configuration without any complicated devices such as character recognizing means and the like to detect irregular components in an original and separate and erase the irregular components whereby a clean duplicate free from smudges can be obtained.

(Embodiment 3)

Figure 8:
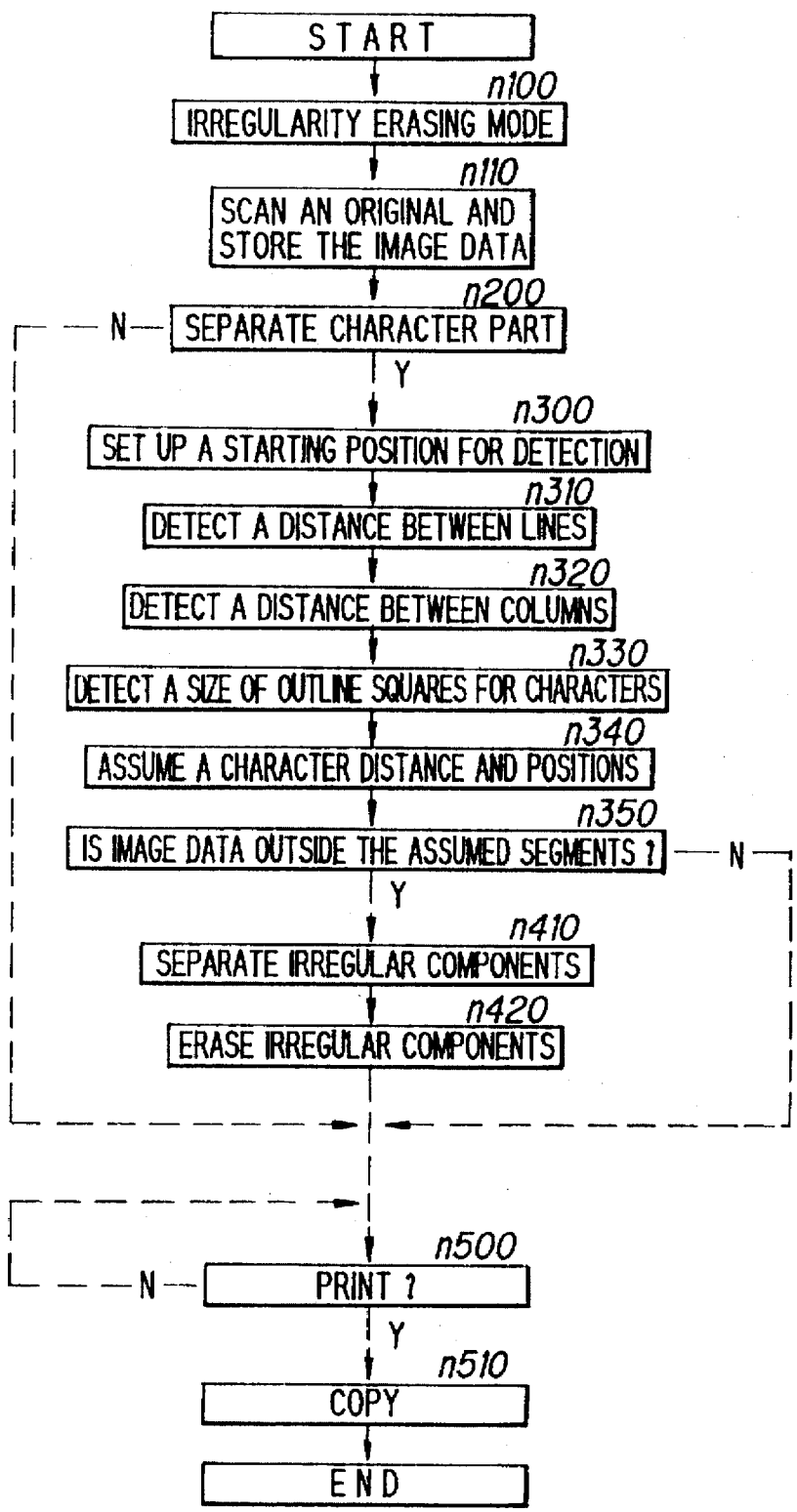
FIG. 8 is a flowchart showing a processing procedure of copying in a third embodiment (embodiment 3) of the present invention.
Figure 9:
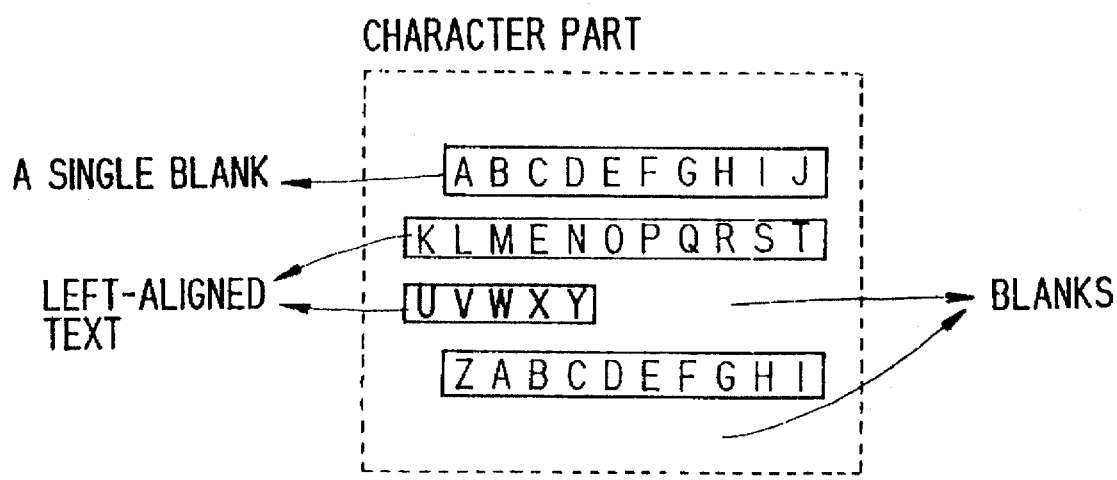
FIG. 9 is an illustrative view showing a schematic example of the copying procedure shown in FIG. 8.

Referring to FIGS. 8 and 9, an embodiment of the third feature of the present invention will be described. FIG. 8 is a flowchart showing a processing procedure of copying and FIG. 9 is an illustrative view showing a schematic example of the copying procedure shown in FIG. 8. In this embodiment, the copying operation is effected by assuming positions of character segments of the whole character strings based on the size and interval of outline squares for characters residing on the first line and in the first column on an original image data, detecting irregular components in image data based on whether the image data belongs to the outside of the assumed character segments, and separating and removing the determined irregular components.

When a correcting mode key 92 on the control panel 9 is pressed, the irregularity erasing mode is activated (n100).

Next, in the same manner as above, the apparatus scans an original so as to store image data into the memory (n110).

The apparatus detects whether the original contains characters and selects a next step based on the result (n200).

The detection of whether the original contains characters can be done by sampling characteristics of characters or character recognition. The former method is effected by separating image data into connected pattern units on the basis of features of characters, that is, characters are small, isolated from one another and arranged at intervals of a constant distance and other possible characteristics, and determining whether the patterns coincide with the size of characters.

If the original does not contain any character, a normal copying operation is carried out (n500 to n510).

If the original contains characters, the operation is effected in the steps of:

separating character part;

selecting a starting character for detection by detecting such characteristics that a first letter on a line is aligned with most of other first letters on other lines and the line in question has all blanks after a certain position (n300);

detecting the distance in the entire character part between the lines of characters and detecting the distance in the entire character part between columns of characters so as to determine an overall size of outline squares for the characters (n310→n320→n330);

assuming positions of characters based on the size of outline squares for the characters to define character segments (n340);

judging whether any part of the image data in character part lies outside the character segments and selecting a next step based on the judgment (n350); and effecting a normal copying operation (n500→n510) if the image data inside the character part is all contained in the defined character segments, if any parts of the image data inside the character part lie outside the character segments, determining the part as irregular components and effecting a copying operation after separating and erasing the irregular components (n410→n420→n500→n510).

An advantage of the embodiment 3 is that since the assumption of character portions is effected from a first character on the top line of a document, it is possible, even in a case of a document having a plenty of blanks, to determine whether image data exists in expected areas based on the detection of the size of outline squares for characters and this allows a simple configuration without any complicated devices such as character recognizing means and the like to detect irregular components in an original and separate and erase the irregular components in a more precise manner whereby a clean duplicate free from smudges can be obtained.

(Embodiment 4)

Figure 10:
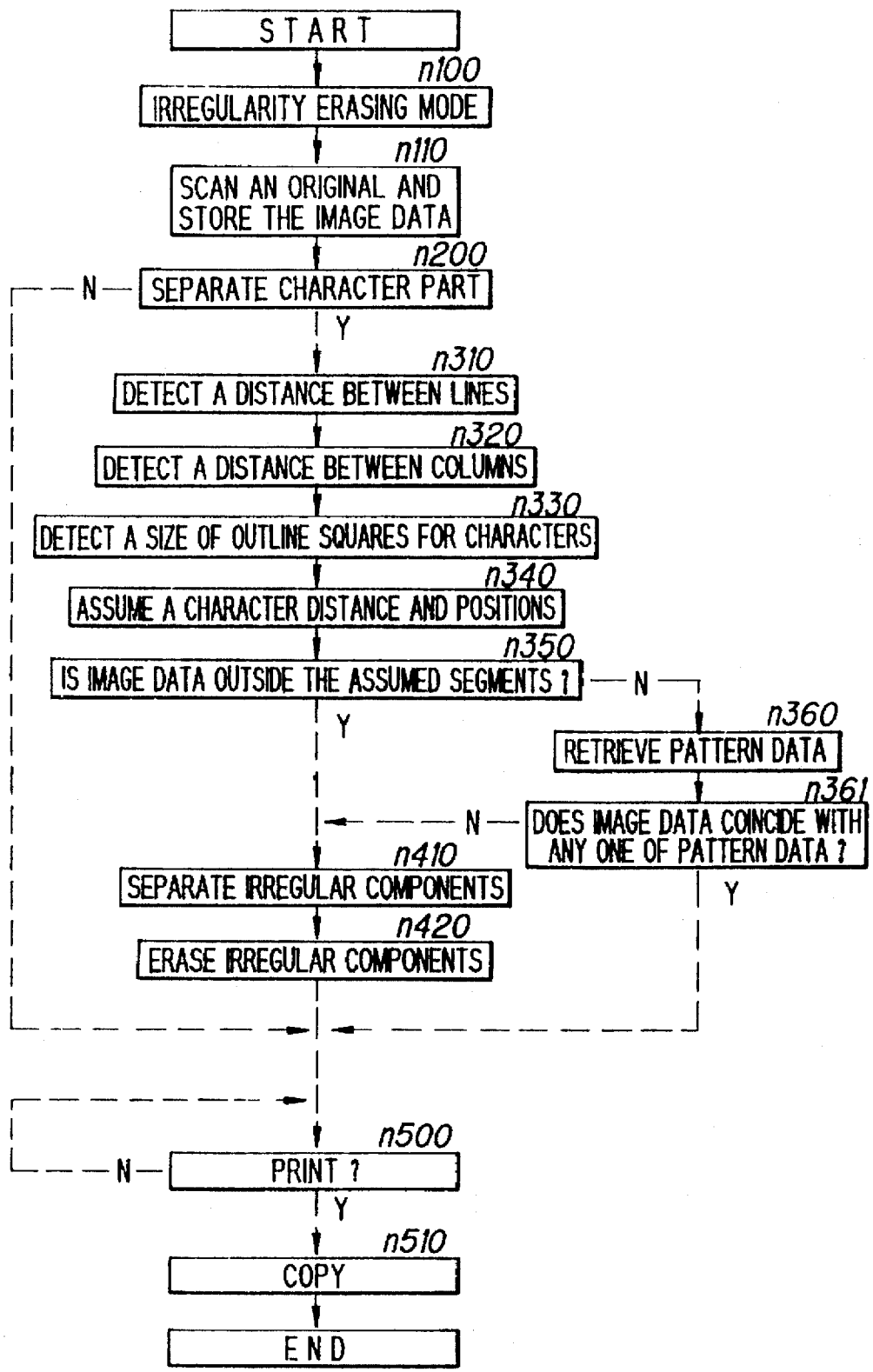
FIG. 10 is a flowchart showing a processing procedure of copying in a fourth embodiment (embodiment 4) of the present invention.
Figure 11:
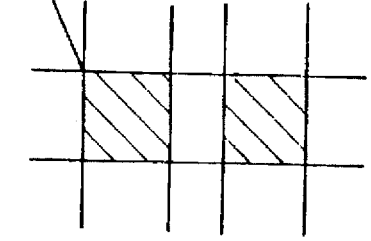
FIG. 11 is an illustrative view showing a schematic example of the copying procedure shown in FIG. 10.

Referring to FIGS. 10 and 11, an embodiment of the fourth feature of the present invention will be described. FIG. 10 is a flowchart showing a processing procedure of copying and FIG. 11 is an illustrative view showing a schematic example of the copying procedure shown in FIG. 10. In this embodiment, a means of determining irregular components is provided which determines irregular components by assuming positions of character segments based on the size and interval of outline squares for characters on an original image data and determining whether the image data belongs to the outside of the assumed character segments, and for data inside any of the assumed character segments, comparing the data with a pattern data set to know whether the data coincides with one of pattern data.

When a correcting mode key 92 on the control panel 9 is pressed, the irregularity erasing mode is activated (n100).

Next, in the same manner as above, the apparatus scans an original so as to store image data into the memory (n110).

The apparatus detects whether the original contains characters and selects a next step based on the result (n200).

The detection of whether the original contains characters can be done by sampling characteristics of characters or character recognition. The former method is effected by separating image data into connected pattern units on the basis of features of characters, that is, characters are small, isolated from one another and arranged at intervals of a constant distance and other possible characteristics, and determining whether the patterns coincide with the size of characters.

If the original does not contain any character, a normal copying operation is carried out (n500 to n510).

If the original contains characters, the operation is effected in the steps of:

separating character part;

detecting the distance in the entire character part between lines of characters and detecting the distance in the entire character part between columns of characters so as to determine an overall size of outline squares for the characters (n310→n320→n330);

assuming positions of characters based on the size of outline squares for the characters to define character segments (n340);

judging whether any part of the image data in the character part lies outside the character segments and selecting a next step based on the judgment (n350);

if any image data belongs to any one of the defined character segments, retrieving pattern data pre-stored and comparing the image data with pattern data as shown in FIG. 11 and selecting a next step based on the result of the comparison (n360→n361); and if the image data coincides with the pattern data, effecting a normal copying operation (n500→n510), if the image data does not coincide with the pattern data, determining the part as irregular components and effecting a copying operation after separating and erasing the irregular components (n410→n420→n500→n510).

An advantage of the embodiment 4 is that since irregular components are distinguished by determining whether image data exists in expected areas based on the detection of the size of outline squares for characters and by comparing the image data with preset patterns, it is possible for a simple configuration having only a specified pattern recognizing scheme to effect an improved detection of irregular components in an original and separate and erase the irregular components whereby a clean duplicate free from smudges can be obtained.

(Embodiment 5)

Figure 12:
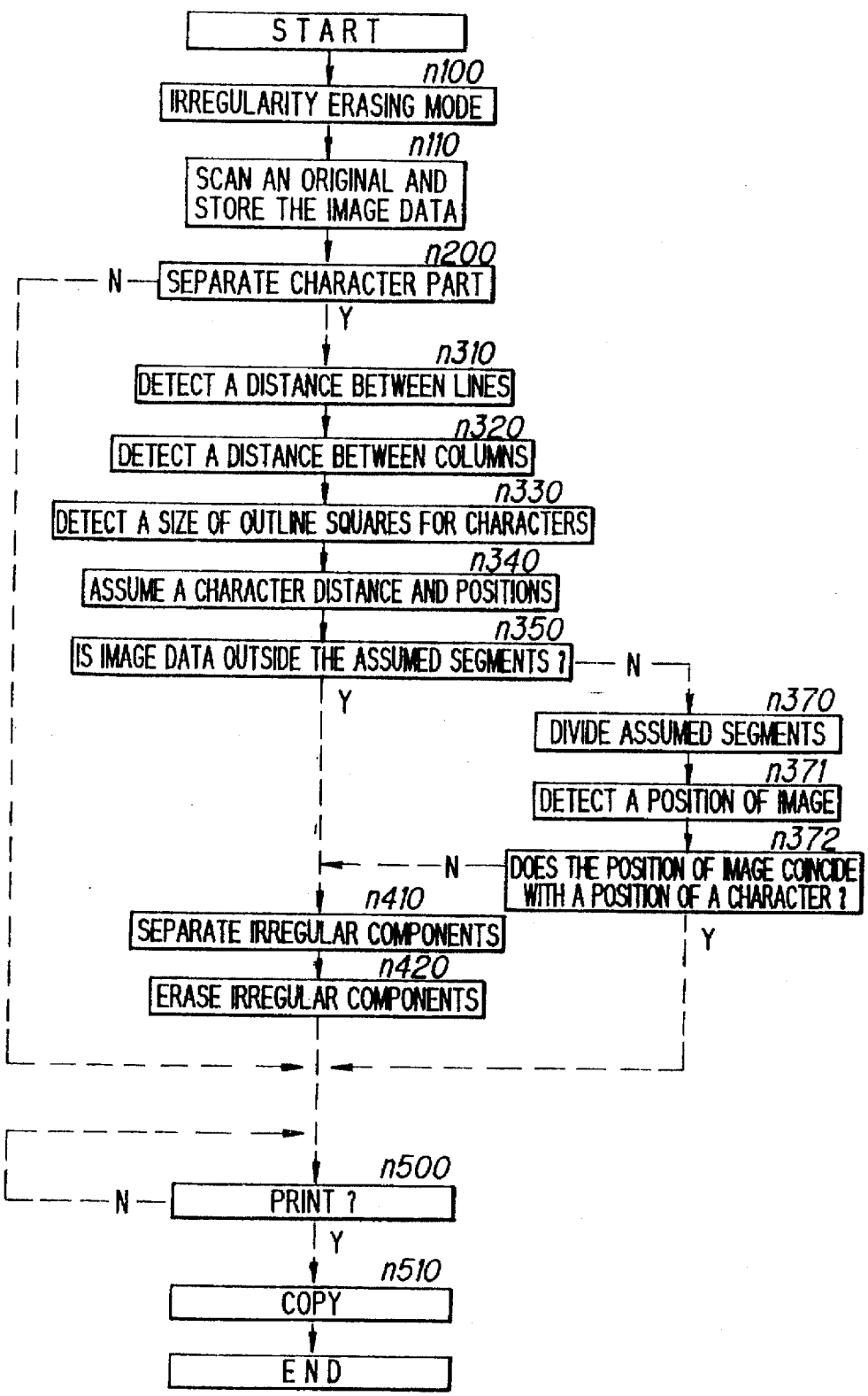
FIG. 12 is a flowchart showing a processing procedure of copying in a fifth embodiment (embodiment 5) of the present invention.
Figure 13:
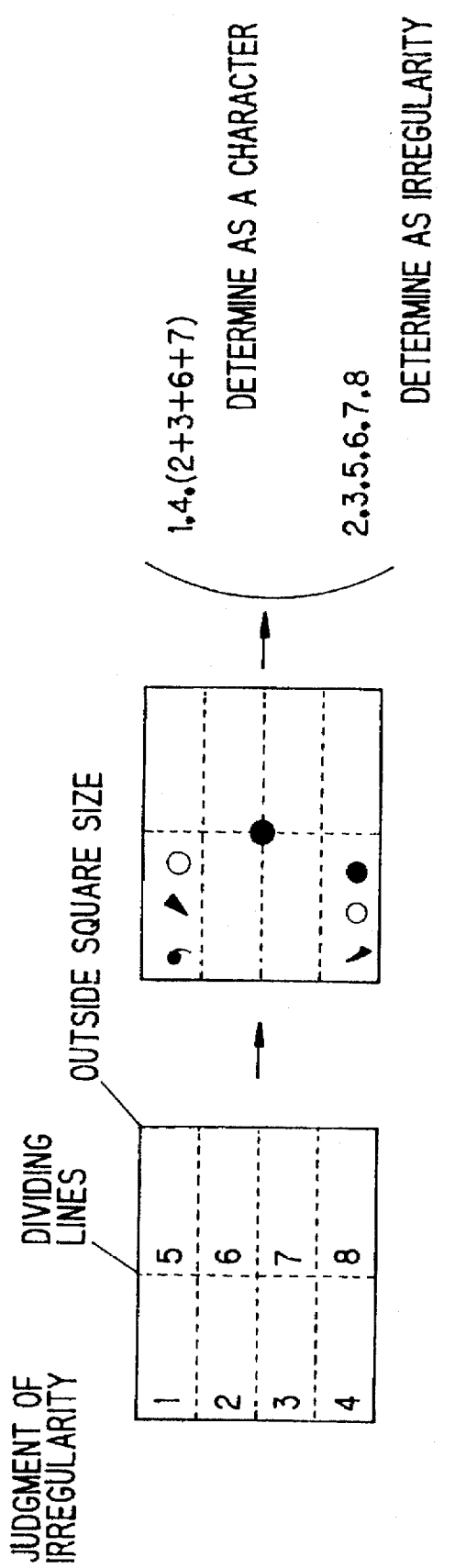
FIG. 13 is an illustrative view showing a schematic example of the copying procedure shown in FIG. 12.

Referring to FIGS. 12 and 13, an embodiment of the fifth feature of the present invention will be described. FIG. 12 is a flowchart showing a processing procedure of copying and FIG. 13 is an illustrative view showing a schematic example of the copying procedure shown in FIG. 12. In this embodiment, a means of determining irregular components is provided which detects irregular components by assuming positions of character segments based on the size and interval of outline squares for characters on an original image data and determining whether the image data belongs to the outside of the assumed character segments to determine, and for data inside any of the assumed character segments, dividing the character position segment into sub-sections and determining which sub-section the data belongs to.

When a correcting mode key 92 on the control panel 9 is pressed, the irregularity erasing mode is activated (n100).

Next, in the same manner as above, the apparatus scans an original so as to store image data into the memory (n110).

The apparatus detects whether the original contains characters and selects a next step based on the result (n200).

The detection of whether the original contains characters can be done by sampling characteristics of characters or character recognition. The former method is effected by separating image data into connected pattern units on the basis of features of characters, that is, characters are small, isolated from one another and arranged at intervals of a constant distance and other possible characteristics, and determining whether the patterns coincide with the size of characters.

If the original does not contain any character, a normal copying operation is carried out (n500 to n510).

If the original contains characters, the operation is effected in the steps of:

separating character part;

detecting the distance in the entire character part between lines of characters and detecting the distance in the entire character part between columns of characters so as to determine an overall size of outline squares for the characters (n310→n320→n330);

assuming positions of characters based on the size of outline squares for the characters to define character segments (n340);

judging whether any part of the image data in the character part lies outside the character segments and selecting a next step based on the judgment (n350);

if any probably irregular image data belongs to any one of the defined character segments, dividing the character segment into sub-segments and determining which sub-segment the image data in question belongs as shown in FIG. 13 and selecting a next step based on the result of the determination (n370→n371→n372), if the probably irregular image data coincides with any of character elements in the character segment, effecting a normal copying operation (n500→n510), if the probably irregular image data does not coincide with any of character elements in the character segment, determining the part as irregular components and effecting a copying operation after separating and erasing the irregular components (n410→n420→n500→n510), and if any parts of the probably irregular image data inside the character part lie outside the character segments, determining the part as irregular components and effecting a copying operation after separating and erasing the irregular components (n410→n420→n500→n510).

An advantage of the embodiment 5 is that since irregular components are distinguished by determining whether image data exists in expected areas based on the detection of the size of outline squares for characters and determining positions of the image data inside the expected segment, it is possible for a simple configuration to detect effective components and irregular components in an original with improved precision and separate and erase the irregular components whereby a clean duplicate free from smudges can be obtained.

(Embodiment 6)

Figure 14:
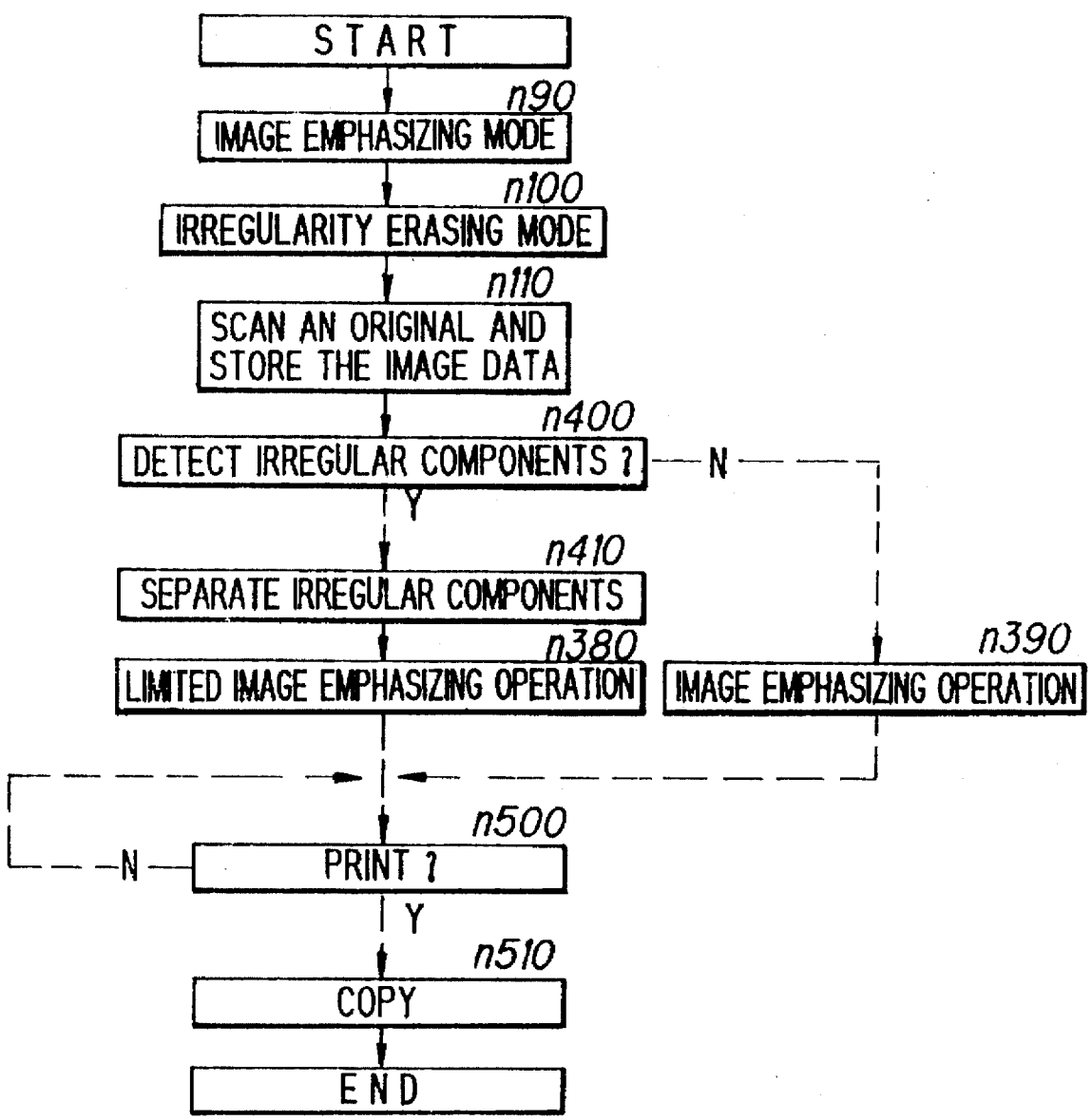
FIG. 14 is a flowchart showing a processing procedure of copying in a sixth embodiment (embodiment 6) of the present invention.
Figure 15:
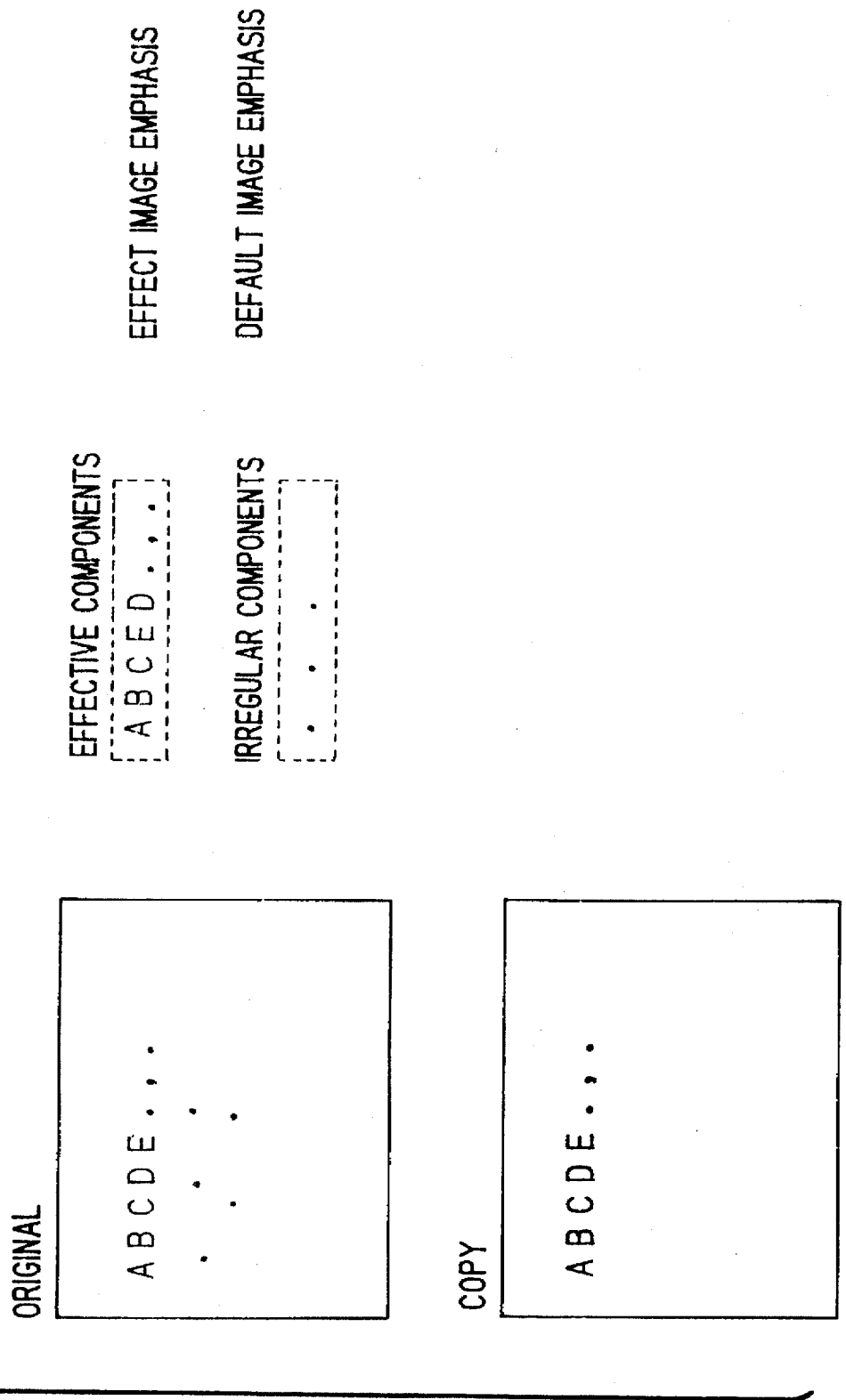
FIG. 15 is an illustrative view showing a schematic example of the copying procedure shown in FIG. 14.

Referring to FIGS. 14 and 15, an embodiment of the sixth feature of the present invention will be described. FIG. 14 is a flowchart showing a processing procedure of copying and FIG. 15 is an illustrative view showing a schematic example of the copying procedure shown in FIG. 14. In this embodiment, if an image emphasizing mode is set up in the copier, the apparatus detects effective components and irregular components in data on an original, and separates them from one another, whereby a copying operation is carried out without the irregular components subjected to the image processing for emphasis.

Initially, the image emphasizing mode is set up (n90).

When a correcting mode key 92 on the control panel 9 is pressed, the irregularity erasing mode is activated (n100).

Next, in the same manner as above, the apparatus scans an original so as to store image data into the memory (n110).

The apparatus detects irregular components in the image data on the original and selects a next step based on the result (n400).

The detection of irregular components in the image data on the original can be done by taking notice of the size and pattern of isolated image data as characteristics of irregular components, or by observing distribution of likely irregular components and determining whether likely irregular components are located outside character segments.

When no irregular component is detected in the image data on the original, a copying operation is carried out as shown in FIG. 15 by subjecting the image to image emphasizing processes such as, for example, shadowing, outlining and dotting (n390→n500→n510).

When irregular components are detected in the image data on the original, the apparatus separates the irregular components and effects a copying operation so that the irregular components may not be subjected to any image emphasizing treatment (n410→n380→n500→n510).

An advantage of the embodiment 6 is that since, in the image emphasizing mode, the apparatus detects effective components and irregular components in an original, separates them from one another and effects an emphasizing copying operation in such a manner that the likely irregular components may not be subjected to any emphasizing treatment, it is possible to obtain a duplicate without any irregularity augmented.

(Embodiment 7)

Figure 16:
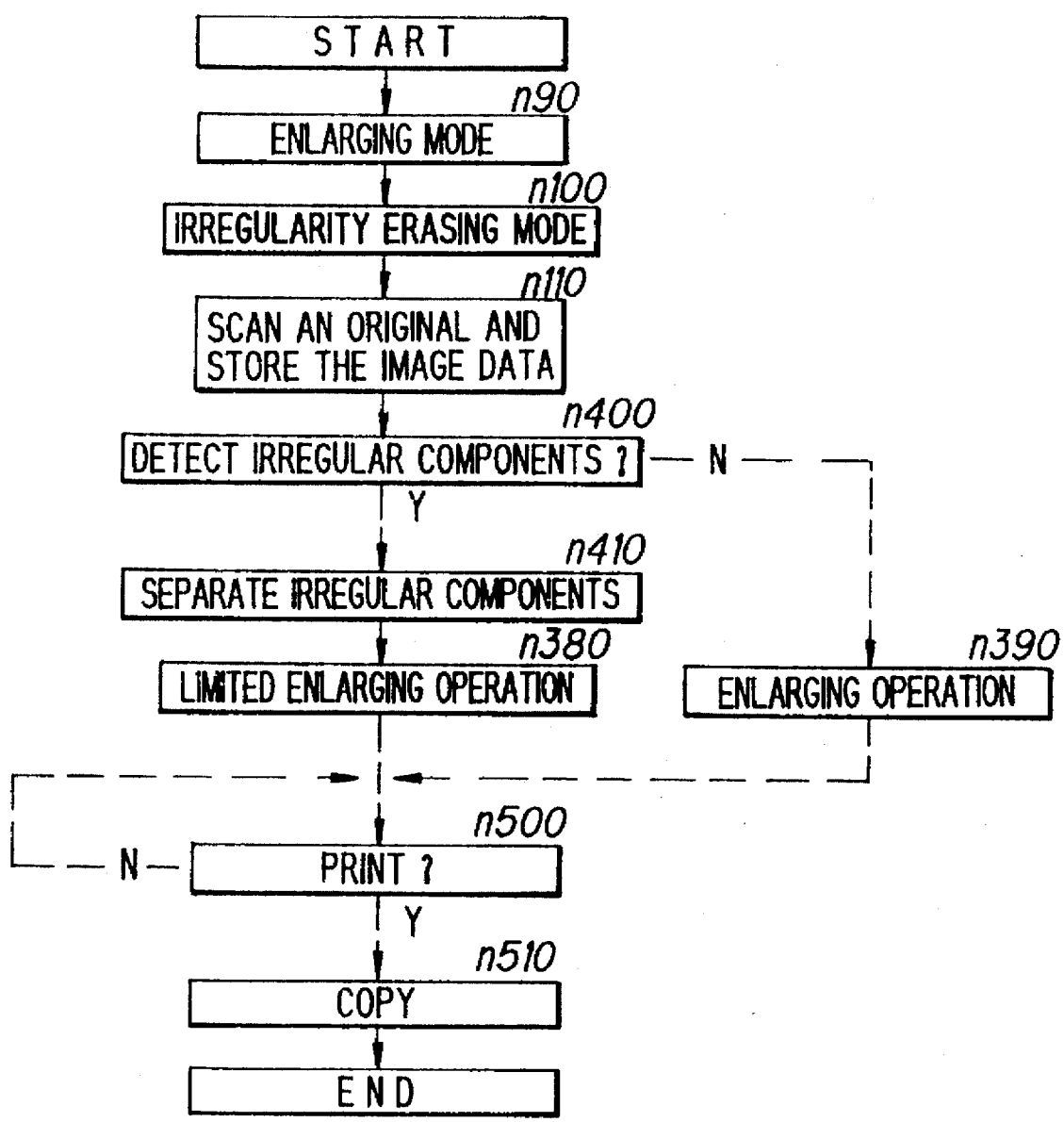
FIG. 16 is a flowchart showing a processing procedure of copying in a seventh embodiment (embodiment 7) of the present invention.
Figure 17:
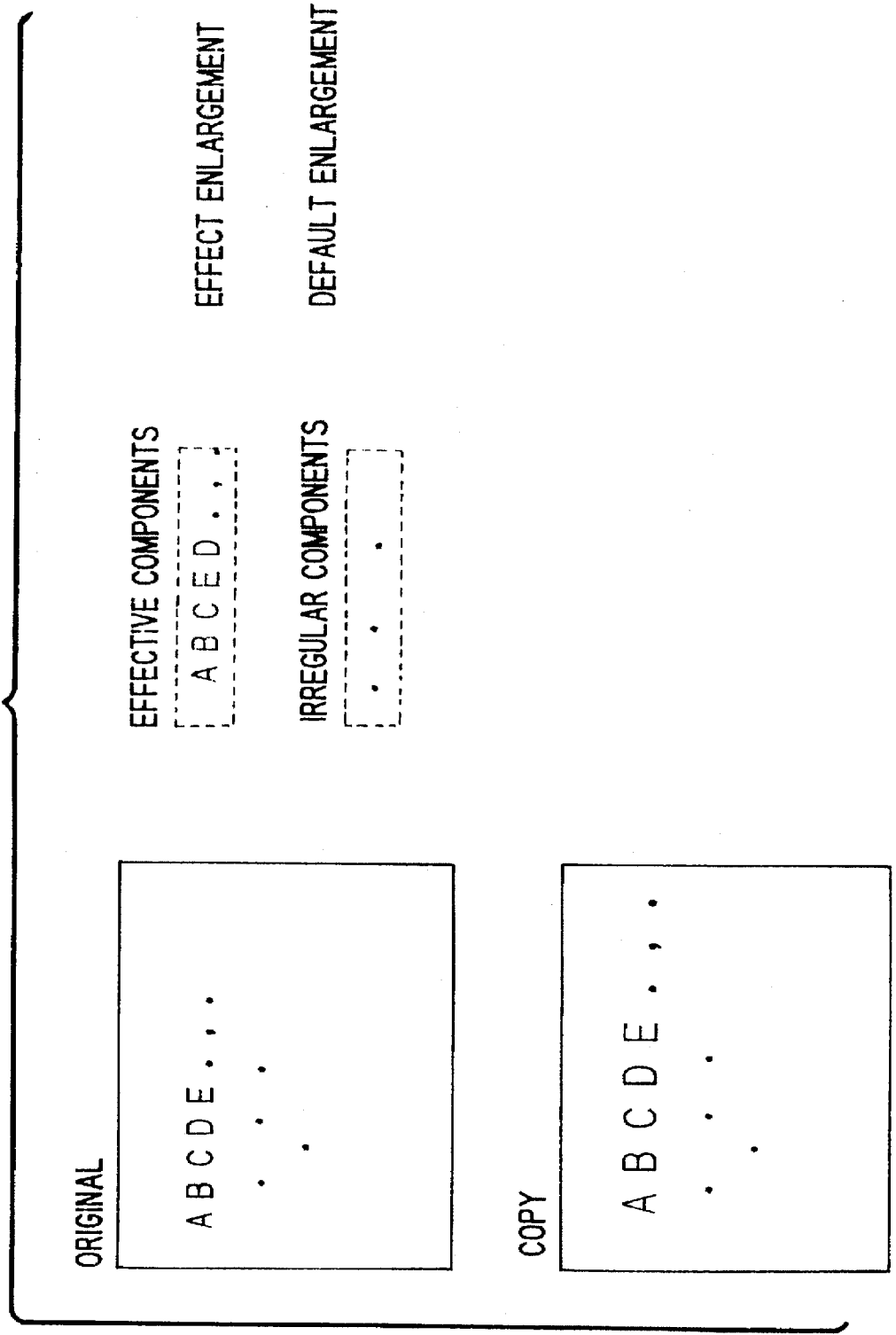
FIG. 17 is an illustrative view showing a schematic example of the copying procedure shown in FIG. 16.

Referring to FIGS. 16 and 17, an embodiment of the seventh feature of the present invention will be described. FIG. 16 is a flowchart showing a processing procedure of copying and FIG. 17 is an illustrative view showing a schematic example of the copying procedure shown in FIG. 16. In this embodiment, if an enlargement mode is set up in the copier, the apparatus detects effective components and irregular components in data on an original, and separates them from one another, whereby a copying operation is carried out without any irregular components subjected to the image processing for enlargement.

Initially, the enlargement mode is set up (n90).

When a correcting mode key 92 on the control panel 9 is pressed, the irregularity erasing mode is activated (n100).

Next, in the same manner as above, the apparatus scans an original so as to store image data into the memory (n110).

The apparatus detects irregular components in the image data on the original and selects a next step based on the result (n400).

The detection of irregular components in the image data on the original can be done by taking notice of the size and pattern of isolated image data as characteristics of irregular components, or by observing distribution of likely irregular components and determining whether likely irregular components are located outside character segments.

When no irregular component is detected in the image data on the original, a copying operation is carried out with the image enlarged (n390→n500→n510).

When irregular components are detected in the image data on the original, the apparatus separates the irregular components and effects a copying operation so that the irregular components as shown in FIG. 17 may not be subjected to any enlarging process (n410→n380→n500→n510).

An advantage of the embodiment 7 is that since the apparatus in the enlargement mode detects effective components and irregular components in an original, separates them from one another and effects an enlarging copying operation in such a manner that the likely irregular components may not be subjected to any image processing for enlargement, it is possible to obtain a duplicate without any irregularity augmented.

(Embodiment 8)

Figure 18:
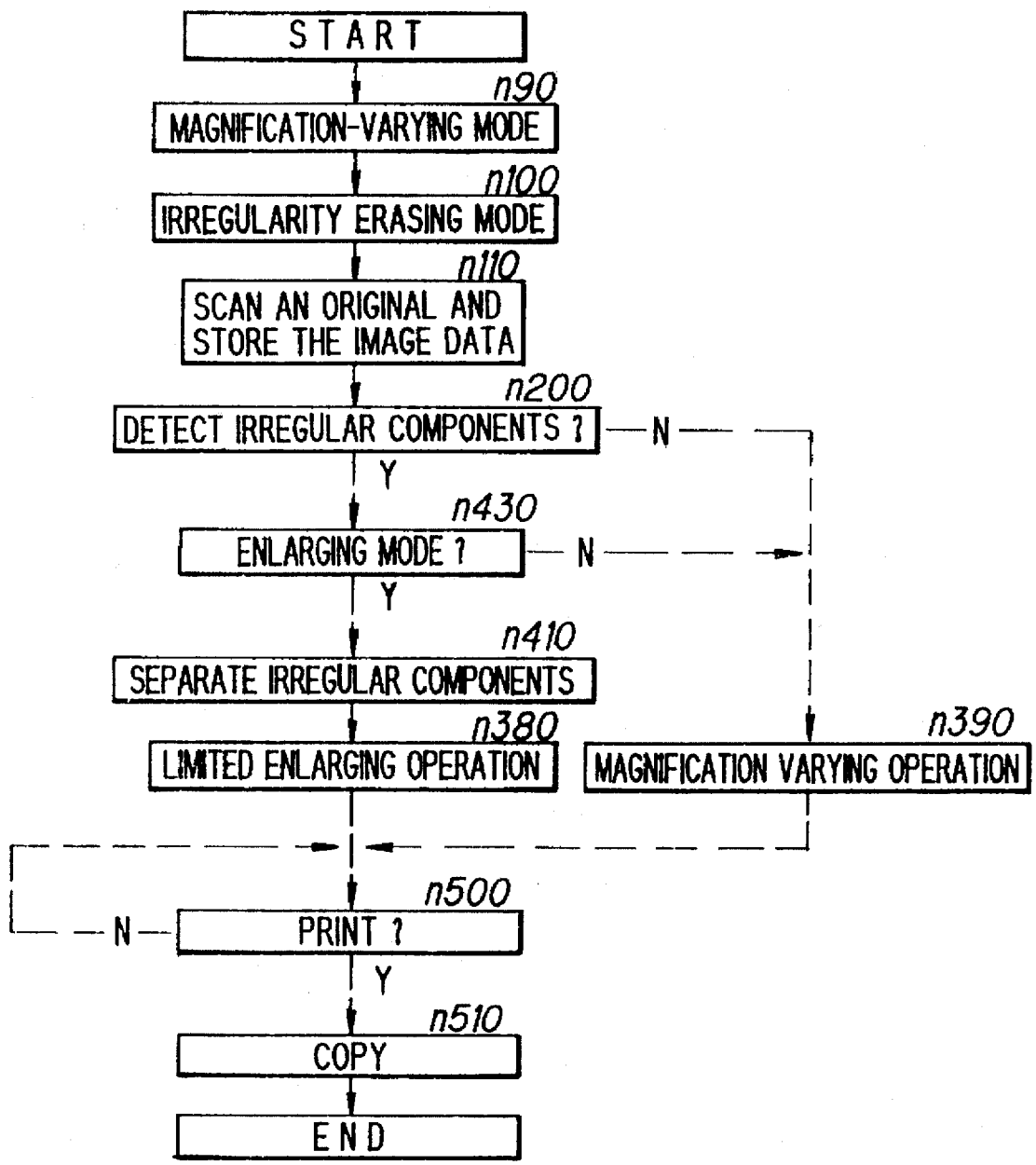
FIG. 18 is a flowchart showing a processing procedure of copying in an eighth embodiment (embodiment 8) of the present invention.
Figure 19:
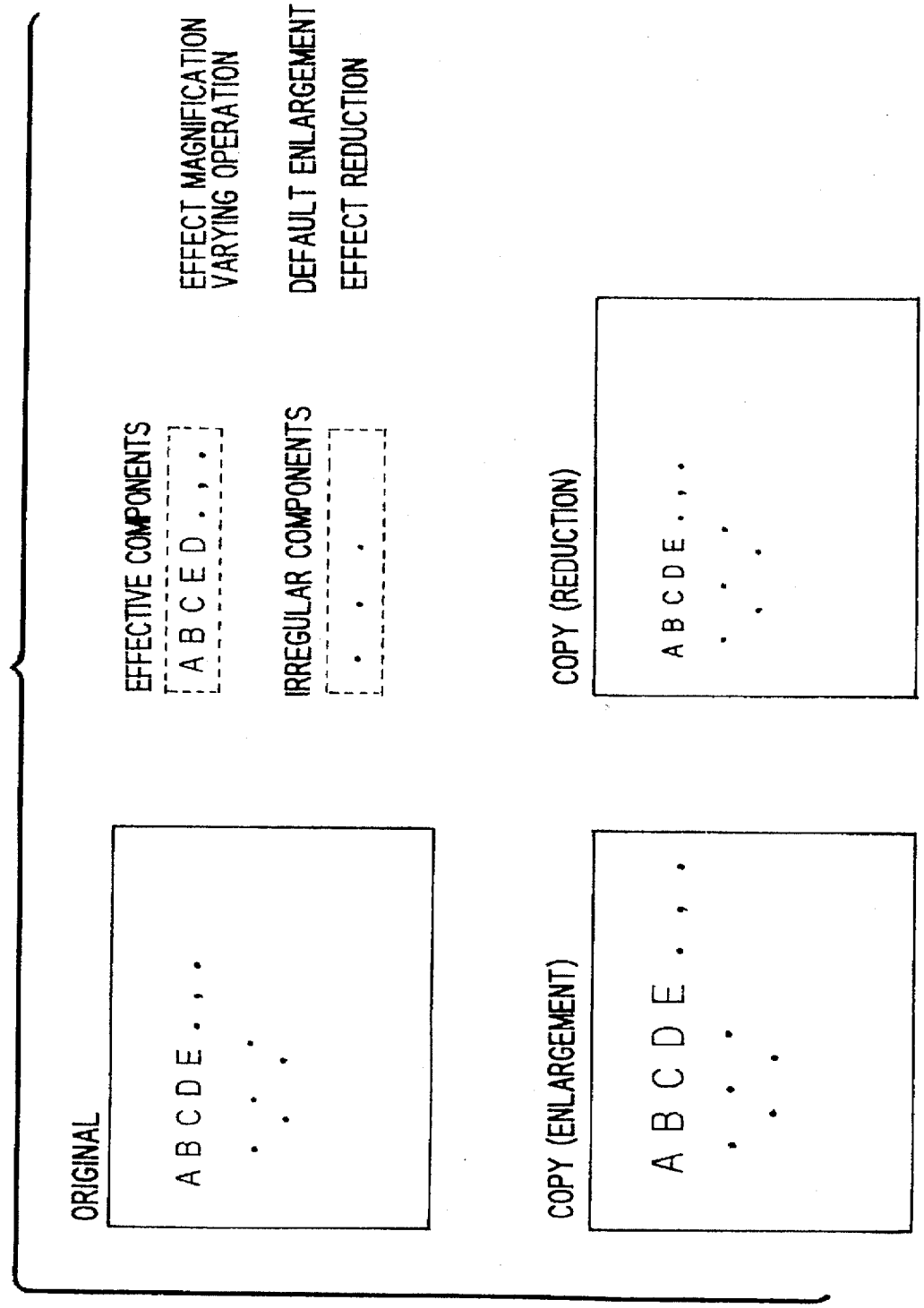
FIG. 19 is an illustrative view showing a schematic example of the copying procedure shown in FIG. 18.

Referring to FIGS. 18 and 19, an embodiment of the eighth feature of the present invention will be described. FIG. 18 is a flowchart showing a processing procedure of copying and FIG. 19 is an illustrative view showing a schematic example of the copying procedure shown in FIG. 18. In this embodiment, when a magnification-varying mode is set up in the copier, the apparatus detects effective components and irregular components in data on an original, and separates them from one another, whereby a copying operation in a case of enlargement is carried out without any irregular components subjected to the image processing for enlargement.

Initially, the magnification-varying mode is set up (n90).

When a correcting mode key 92 on the control panel 9 is pressed, the irregularity erasing mode is activated (n100).

Next, in the same manner as above, the apparatus scans an original so as to store image data into the memory (n110).

The apparatus detects irregular components in the image data on the original and selects a next step based on the result (n400).

The detection of irregular components in the image data on the original can be done by taking notice of the size and pattern of isolated image data as characteristics of irregular components, or by observing distribution of likely irregular components and determining whether likely irregular components are located outside character segments.

When detecting no irregular component in the image data on the original, the apparatus effects a copying operation with the magnification of the image varied (n390→n500→n510).

When detecting irregular components in the image data on the original, the apparatus selects a next step based on whether the magnification-varying mode is set up in an enlarging state (n430).

If the magnification-varying mode is not set up in an enlarging state, a copying operation is merely effected by changing the magnification of the image (n390→n500→n510).

If the magnification-varying mode is set up in an enlarging state, a copying operation is effected after irregular components are separated in such a manner as shown in FIG. 19 that the likely irregular components may not be subjected to any image processing for enlargement (n410→n380→n500→n510).

An advantage of the embodiment 8 is that since the apparatus in the magnification-varying mode detects effective components and irregular components in an original separates them from one another and effects a copying operation in such a manner that the likely irregular components may not be subjected to enlarging treatment, it is possible to obtain a duplicate without any irregularity augmented.

(Embodiment 9)

Figure 20:
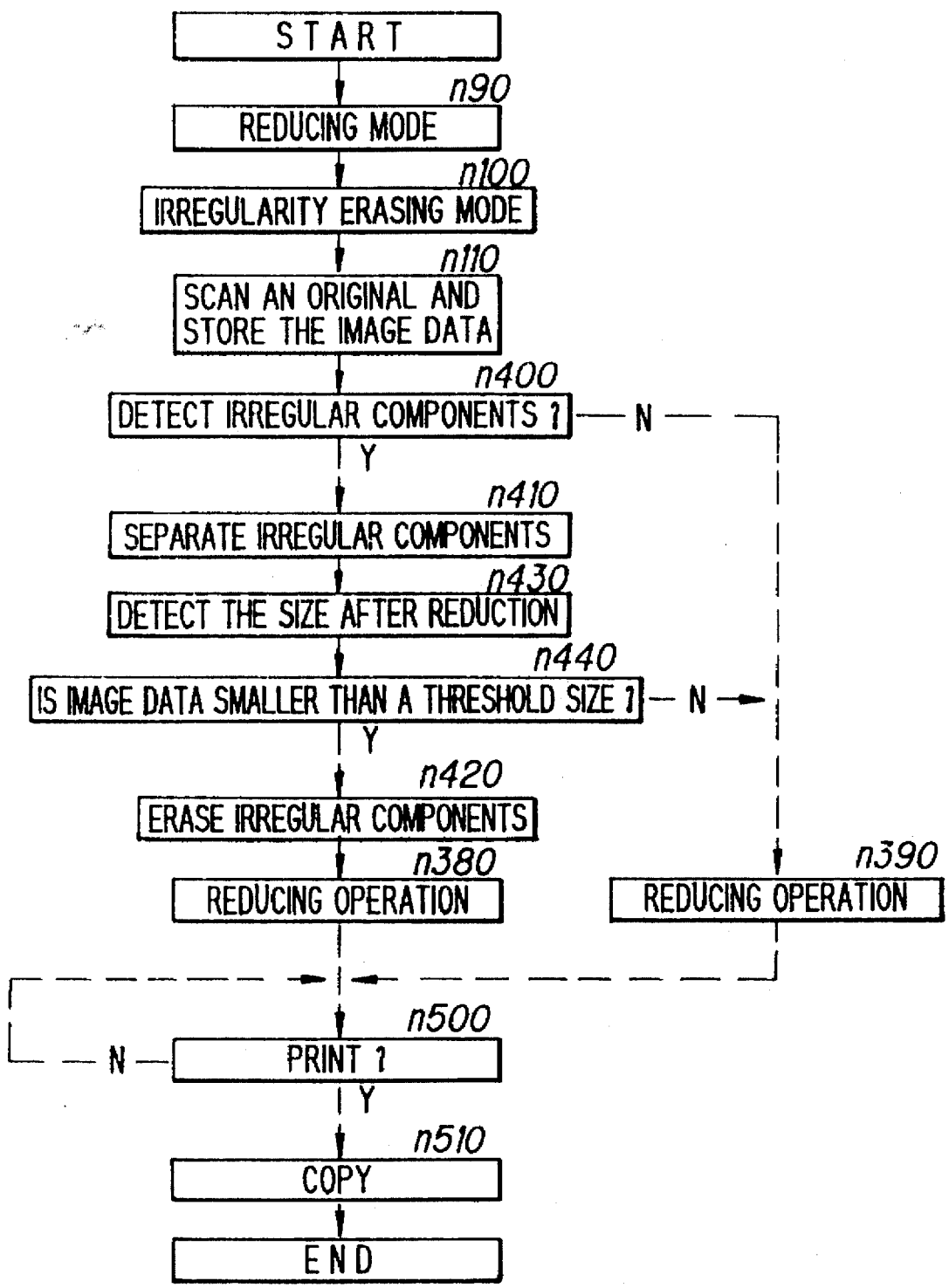
FIG. 20 is a flowchart showing a processing procedure of copying in a ninth embodiment (embodiment 9) of the present invention.

Referring to FIGS. 20 and 21, an embodiment of the ninth feature of the present invention will be described. FIG. 20 is a flowchart showing a processing procedure of copying and FIG. 21 is an illustrative view showing a schematic example of the copying procedure shown in FIG. 21. In this embodiment, when a reducing mode is set up in the copier, the apparatus detects effective components and irregular components in data on an original. Then, if expected reducing result of some irregular components detected is as small as or smaller than a threshold size, the apparatus separates such irregularity to erase it, to thereby effect a copying operation.

Initially, the reducing mode is set up (n90).

When a correcting mode key 92 on the control panel 9 is pressed, the irregularity erasing mode is activated (n100).

Next, in the same manner as above, the apparatus scans an original so as to store image data into the memory (n110).

The apparatus detects irregular components in the image data on the original and selects a next step based on the result (n400).

The detection of irregular components in the image data on the original can be done by taking notice of the size and pattern of isolated image data as characteristics of irregular components, or by observing distribution of likely irregular components and determining whether likely irregular components are located outside character segments.

When detecting no irregular component in the image data on the original, the apparatus effects a copying operation with the magnification of the image varied (n390→n500→n510).

When detecting irregular components in the image data on the original, the apparatus separates the irregular components in order to estimate sizes of the irregular components after reduction and compare them with a threshold value, then selects a next step based on the result (n410→n430→n440).

If the copier used has a resolution of 400 DPI, the threshold value is set to be 8 dots (about 0.5 mm, because 1 dot=63.5 μm).

If the size of some irregular components after reduction is greater than the threshold value, a copying operation is effected with the irregular components reduced (n390→n500→n510).

If the size of some irregular components after reduction is smaller than the threshold value, a copying operation is effected after the irregular components are erased (n420→n380→n500→n510).

An advantage of the embodiment 9 is that since the apparatus in the image-reducing mode detects effective components and irregular components in an original, separates them from one another and effects a copying operation in such a manner that the components which are likely to be irregularity and become trivial in size after reduction are erased, it is possible to obtain a duplicate with irregularity erased.

(Embodiment 10)

Figure 22:
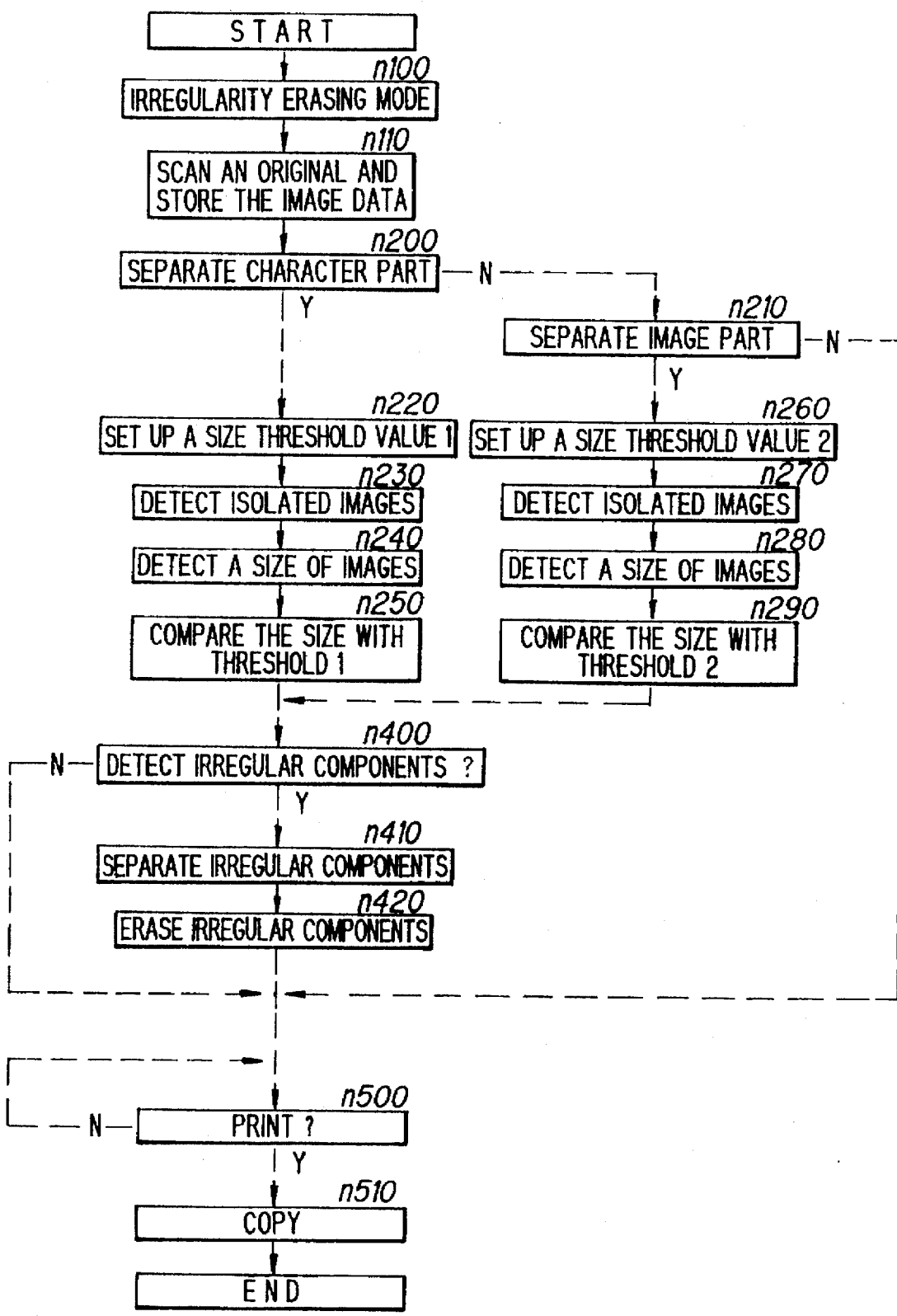
FIG. 22 is a flowchart showing a processing procedure of copying in a tenth embodiment (embodiment 10) of the present invention.
Figure 23:
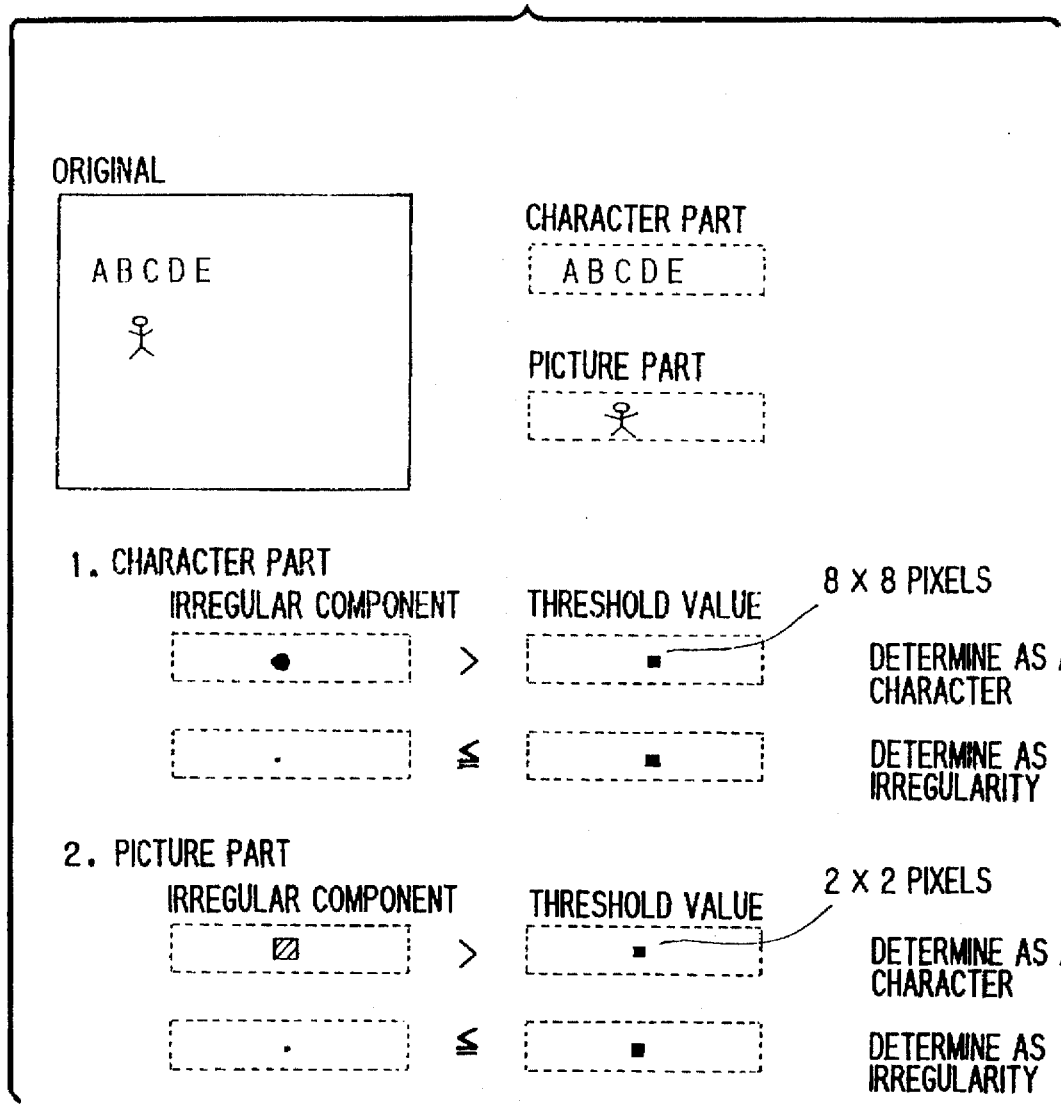
FIG. 23 is an illustrative view showing a schematic example of the copying procedure shown in FIG. 22.

Referring to FIGS. 22 and 23, an embodiment of the tenth feature of the present invention will be described. FIG. 22 is a flowchart showing a processing procedure of copying and FIG. 23 is an illustrative view showing a schematic example of the copying procedure shown in FIG. 22. In this embodiment, a copying operation is performed by separating image data into two parts, that is, character part and picture part, comparing sizes of image data in character and picture parts with respective different threshold values to determine irregular components and separating and erasing the irregular component.

When a correcting mode key 92 on the control panel 9 is pressed, the irregularity erasing mode is activated (n100).

Next, in the same manner as above, the apparatus scans an original so as to store image data into the memory (n110).

The apparatus detects whether the original contains characters and selects a next step based on the result (n200).

The detection of whether the original contains characters can be done by sampling characteristics of characters or character recognition. The former method is effected by separating image data into connected pattern units on the basis of features of characters, that is, characters are small, isolated from one another and arranged at intervals of a constant distance and other possible characteristics, and determining whether the patterns coincide with the size of characters.

When the original contains characters, the apparatus separates character part and compares sizes of detected, isolated image data with a threshold value for character part, then effects a next step (n220→n230→n240→n250→n400).

17

If the copier used has a resolution of 400 DPI, the threshold value for character part is set to be 8 dots (about 0.5 mm, because 1 dot=63.5 μm) and the copier determines isolated image data smaller than that size as to be irregular data.

When the original contains no characters, the apparatus effects picture detection of whether the original contains pictures and selects a next step based on the result (n210).

The detection of whether or not there is pictures can be done by using histogram of halftone density and the like.

When the original contains pictures, the apparatus separates the picture part and compares sizes of detected, isolated image data with a threshold value for picture part, then effects a next step (n260→n270→n280→n290→n400).

If the copier used has a resolution of 400 DPI, the threshold value for picture part is set to be 2 dots (1 dot=63.5 μm) and the copier determines isolated image data smaller than that size as to be irregular data.

If the copier reproduces halftone images with a number of dots, the threshold value for picture part can be set as to be smaller than the size of the dot. Alternatively, all the data for picture part can be assumed as effective data, without any determination.

If the original does not contain any picture, a normal copying operation is effected (n500→n510).

If the size of some image data is smaller than the threshold value, the image data is assumed as to be irregular components. Then, a copying operation is effected after the irregular components are separated and erased (n410→n420→n500→n510).

An advantage of the embodiment 10 is that since the threshold values of determining image data to be irregular components for character part and for picture part are made different, this allows a simple configuration to effect an improved detection of effective components and irregular components in an original and separate and erase the irregular components whereby a clean duplicate free from smudges can be obtained.

(Embodiment 11)

Figure 24:
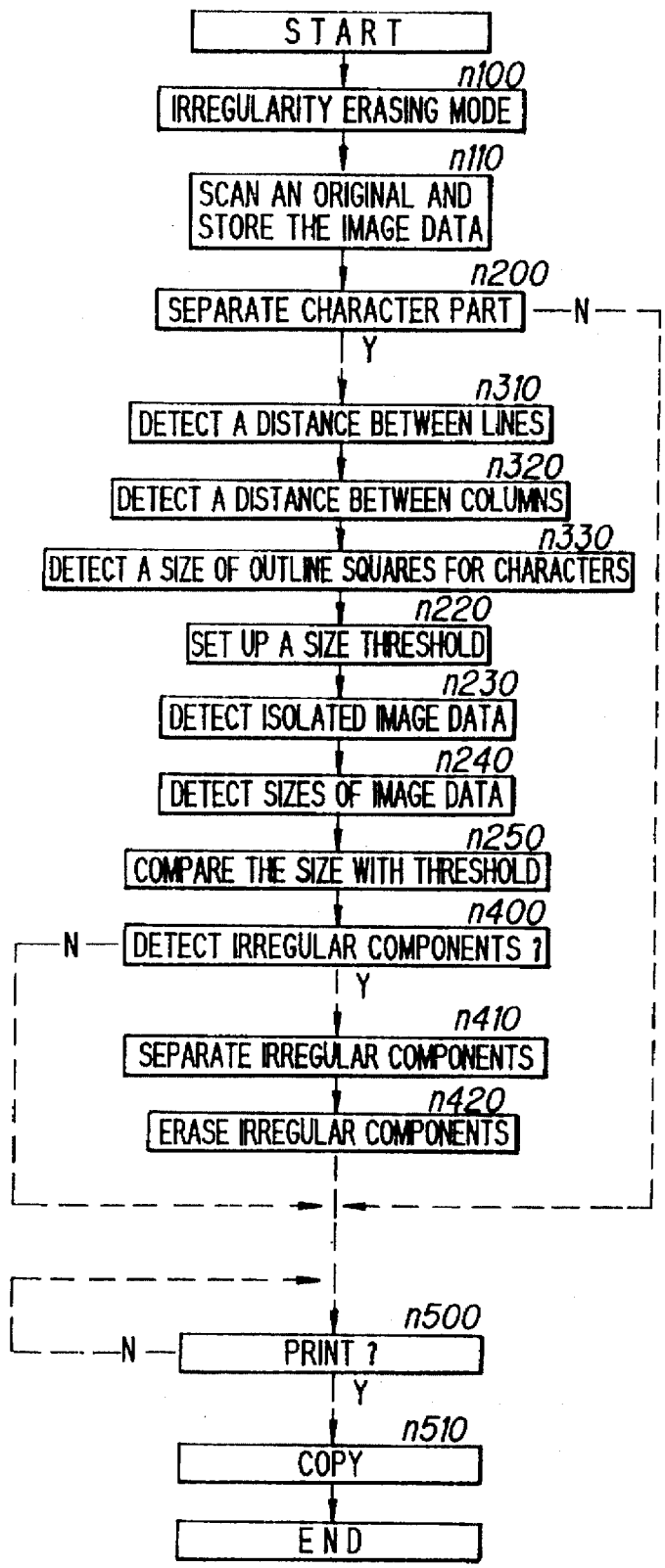
FIG. 24 is a flowchart showing a processing procedure of copying in an eleventh embodiment (embodiment 11) of the present invention.

Referring to FIGS. 24 and 25, an embodiment of the eleventh feature of the present invention will be described. FIG. 24 is a flowchart showing a processing procedure of copying and FIG. 25 is an illustrative view showing a schematic example of the copying procedure shown in FIG. 24. In this embodiment, detection of irregular components is made by setting up different threshold values for different sizes of outline squares for characters and comparing the size of image data with a thus determined corresponding threshold value.

When a correcting mode key 92 on the control panel 9 is pressed, the irregularity erasing mode is activated (n100).

Next, in the same manner as above, the apparatus scans an original so as to store image data into the memory (n110).

The apparatus detects whether the original contains characters and selects a next step based on the result (n200).

The detection of whether the original contains characters can be done by sampling characteristics of characters or character recognition. The former method is effected by separating image data into connected pattern units on the basis of features of characters, that is, characters are small, isolated from one another and arranged at intervals of a constant distance and other possible characteristics, and determining whether the patterns coincide with the size of characters.

18

When the original does not contain any character, a normal copying operation is effected (n500→n510).

When the original contains characters, the apparatus separates character part and detects size of outline squares for characters (n300).

Then, threshold values of sizes of detecting irregular components are set up for different sized outline squares for characters (n220).

For example, as shown in FIG. 25, if characters have an outline square of 4 mm, the apparatus set up the corresponding threshold value to be 0.5 mm (one-eighth of the square side) and determines isolated image data smaller than that as to be irregular data.

Then the apparatus detects isolated image data and detects the size of the data (n230→n 240).

The detection of isolated image data can be done by successively searching connected pixels around a pixel.

The apparatus compares the size of the image data with the set up threshold value and selects a next step based on the result (n250→n400).

When the size of the image data is greater than the set up value, a normal copying operation is effected (n500→n510).

When the size of the image data is smaller than the set up value, a normal copying operation is effected after the noise components is separated and erased (n410→n420→n500→n510).

An advantage of the embodiment 11 is that since the threshold values of determining image data to be irregular components are made different depending on the size of outline square for characters, this allows a simple configuration to effect an improved detection of effective components and irregular components in an original and separate and erase the irregular components whereby a clean duplicate free from smudges can be obtained.

Since the automatic image quality controlling apparatus for use in an electronic copier of the present invention is thus configurated, it is possible to detect effective components and irregular components in an original and separate and erase the irregular components whereby a clean duplicate free from smudges is obtained.

What is claimed is:

1. An automatic image quality controlling apparatus in an electronic copier having
   an image pickup means for optically reading and converting an original image into image signals; and
   an image output means for creating an image from the acquired image signals by said image pickup means and outputting the image on a sheet of paper through a transfer section, said controlling apparatus comprising:
   a detecting means for detecting effective components and suspected irregular components from the image data obtained by said image pickup means;
   an irregular component separating means for separating effective components and suspected irregular components detected by said detecting means; and
   an emphasizing-mode-setting means for effecting image processing for emphasizing images,
   wherein, if the emphasizing mode is set up, the suspected irregular components, separated by said irregular component separating means, are not subjected to the image processing for emphasizing images.

2. An automatic image quality controlling apparatus in an electronic copier having
   an image pickup means for optically reading and converting an original image into image signals; and an image output means for creating an image from the acquired image signals by said image pickup means and outputting the image on a sheet of paper through a transfer section, said controlling apparatus comprising:

a detecting means for detecting effective components and suspected irregular components from the image data obtained by said image pickup means;

an irregular component separating means for separating effective components and suspected irregular components detected by said detecting means; and an enlarging-mode-setting means for enlarging images, wherein, if the enlarging mode is set up, the suspected irregular components, separated by said irregular component separating means, are not subject to the image processing for enlarging images.

3. An automatic image quality controlling apparatus in an electronic copier having an image pickup means for optically reading and converting an original image into image signals; and an image output means for creating an image from the acquired image signals by said image pickup means and outputting the image on a sheet of paper through a transfer section, said controlling apparatus comprising:

a detecting means for detecting effective components and suspected irregular components from the image data obtained by said image pickup means;

an irregular component separating means for separating effective components and suspected irregular components detected by said detecting means;

a magnification-varying-mode-setting means for enlarging or reducing images; and a judging means for judging in which mode, selected from enlarging mode and reducing mode, the apparatus operates when the magnification-varying mode is set up, wherein, based on the result determined by said judging means, in a case of the enlarging mode, suspected irregular components, separated by said irregular component separating means, are not subjected to the image processing for enlarging images while, in a case of the reducing mode, suspected irregular components, separated by said irregular component separating means, are subjected to the image processing for reducing images.

4. An automatic image quality controlling apparatus in an electronic copier having an image pickup means for optically reading and converting an original image into image signals; and an image output means for creating an image from the acquired image signals by said image pickup means and outputting the image on a sheet of paper through a transfer section, said controlling apparatus comprising:

a detecting means for detecting effective components and suspected irregular components from the image data obtained by said image pickup means; and an irregular component separating means for separating effective components and suspected irregular components detected by said detecting means; and a reducing-mode-setting means for reducing images, wherein, when the reducing mode is set up and if the reduced sizes of suspected irregular components, separated by said irregular component separating means, are smaller than a predetermined threshold value, then the suspected irregular components are erased.

5. An automatic image quality controlling apparatus in an electronic copier having an image pickup means for optically reading and converting an original image into image signals; and an image output means for creating an image from the acquired image signals by said image pickup means and outputting the image on a sheet of paper through a transfer section, said controlling apparatus comprising:

an image-area-separating means for classifying the image data, obtained through said image pickup means, into at least one character portion and at least one picture portion;

a first threshold-setting means for indicating the maximum size of irregularity in said character portion;

a second threshold-setting means for indicating the maximum size of irregularity in said picture portion;

a comparatively judging means for comparing the size of isolated image data in each of said character and picture portions with respect to a corresponding threshold value for the portion to which the isolated image data in question belongs;

an irregular-component-separating means for separating irregular components, based on the result determined from said comparatively judging means; and an erasing means for erasing the irregular components separated by said irregular-component-separating means.

6. An automatic image quality controlling apparatus in an electronic copier according to claim 5, further comprising:

an image-area-separating means for classifying respective image data of an original, obtained in said electronic copier, into one of said character portion and said picture portion;

a first detecting means for detecting an overall height of characters based on a distance between character lines in said character portion;

a second detecting means for detecting an overall width of characters based on a distance between character columns in said character portion;

a size-detecting means for detecting an overall size of outline squares for characters, from the information obtained from said first and second detecting means;

a threshold-setting means for setting different maximum sizes of irregularity for different detecting sizes; and a comparatively judging means for comparing the size of image data with a threshold value, determined in accordance with the size of outline squares for characters.

* * * * *